(12) United States Patent
Beavis et al.

(10) Patent No.: US 10,895,898 B2
(45) Date of Patent: Jan. 19, 2021

(54) MANAGEMENT OF REMOTELY CONTROLLED DEVICES

(75) Inventors: Russell H. Beavis, Merrimack, NH (US); Chris P. Jennings, Merrimack, NH (US); Matthew J. Pilotte, Merrimack, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 12/425,149

(22) Filed: Apr. 16, 2009

(65) Prior Publication Data

US 2009/0281676 A1 Nov. 12, 2009

Related U.S. Application Data

(60) Provisional application No. 61/124,318, filed on Apr. 16, 2008, provisional application No. 61/194,988, filed on Oct. 2, 2008.

(51) Int. Cl.
*G06F 1/26* (2006.01)
*H04L 12/12* (2006.01)

(52) U.S. Cl.
CPC .............. *G06F 1/266* (2013.01); *H04L 12/12* (2013.01); *Y02D 30/50* (2020.08)

(58) Field of Classification Search
USPC .................................................. 700/9, 295
See application file for complete search history.

(56) References Cited

U.S. PATENT DOCUMENTS

| 5,927,603 | A  | * | 7/1999  | McNabb ............ A01G 25/092 239/63 |
| 6,167,831 | B1 | * | 1/2001  | Watt ...................... B63G 8/001 114/245 |
| 6,208,905 | B1 | * | 3/2001  | Giddings et al. ............... 700/11 |
| 6,223,675 | B1 | * | 5/2001  | Watt ...................... B63G 8/001 114/312 |
| 6,257,162 | B1 | * | 7/2001  | Watt ...................... B63G 8/001 114/221 R |
| 6,298,377 | B1 | * | 10/2001 | Hartikainen ....... G05B 19/4185 700/17 |

(Continued)

OTHER PUBLICATIONS

Fong, T.; Thorpe, C. and Baur, C., "Advanced Interfaces for Vehicle Teleoperation: Collaborative Control, Sensor Fusion Displays, and Remote Driving Tools", 2001, Autonomous Robots, vol. 11, pp. 77-85, Kluwer Academic Publishers.*

(Continued)

*Primary Examiner* — Mohammad Ali
*Assistant Examiner* — Kelvin Booker
(74) *Attorney, Agent, or Firm* — Kathleen Chapman

(57) ABSTRACT

Systems, apparatus and methods for controlling the ability of a remote control to control at least one remotely controlled device. The systems, methods and apparatus including providing at least one remote controlled remotely controlled device, communicatively coupling the remotely controlled device to a respective driver interface, communicatively coupling the remotely controlled device to a field management system, and sending a signal from the field management system directly to the remotely controlled device. The signal modifies control by the driver interface of the remotely controlled device and modifies power to the remotely controlled device.

20 Claims, 12 Drawing Sheets

(56) References Cited

U.S. PATENT DOCUMENTS

| | | | |
|---|---|---|---|
| 6,408,276 B1 | 6/2002 | Byrne et al. | |
| 6,484,083 B1 | 11/2002 | Hayward et al. | |
| 6,496,860 B2* | 12/2002 | Ludtke et al. | 709/223 |
| 6,636,721 B2* | 10/2003 | Threadgill | H04B 7/18506 |
| | | | 455/12.1 |
| 6,674,259 B1* | 1/2004 | Norman | A63H 11/00 |
| | | | 318/567 |
| 6,732,191 B1* | 5/2004 | Baker et al. | 710/1 |
| 6,816,753 B2* | 11/2004 | Sakamoto | G06N 3/008 |
| | | | 171/107 |
| 6,856,932 B1* | 2/2005 | Wallace | G01K 1/026 |
| | | | 374/E1.005 |
| 6,895,949 B1* | 5/2005 | Stephens | F41B 4/00 |
| | | | 124/6 |
| 6,925,335 B2* | 8/2005 | May et al. | 700/9 |
| 6,965,816 B2* | 11/2005 | Walker | 701/16 |
| 7,139,616 B2* | 11/2006 | May et al. | 700/9 |
| 7,193,384 B1 | 3/2007 | Norman et al. | |
| 7,225,244 B2* | 5/2007 | Reynolds et al. | 709/223 |
| 7,263,597 B2* | 8/2007 | Everdell et al. | 712/11 |
| 7,321,974 B2* | 1/2008 | Anderson et al. | 713/320 |
| 7,330,776 B1* | 2/2008 | Norman | A63H 11/00 |
| | | | 318/568.1 |
| 7,412,338 B2* | 8/2008 | Wynans et al. | 702/61 |
| 7,565,209 B2* | 7/2009 | Yamamoto | 700/19 |
| 7,586,950 B1* | 9/2009 | Damle | H04L 67/025 |
| | | | 370/236 |
| 7,689,842 B2* | 3/2010 | Anderson et al. | 713/310 |
| 7,702,424 B2* | 4/2010 | Cannon et al. | 700/295 |
| 7,704,119 B2* | 4/2010 | Evans | 446/454 |
| 7,823,210 B2* | 10/2010 | Bessonov et al. | 709/246 |
| 7,869,904 B2* | 1/2011 | Cannon et al. | 700/295 |
| 7,957,837 B2* | 6/2011 | Ziegler | B25J 5/007 |
| | | | 700/258 |
| 8,013,550 B1* | 9/2011 | Young et al. | 318/268 |
| 8,030,871 B1* | 10/2011 | Young et al. | 318/461 |
| 8,154,227 B1* | 4/2012 | Young et al. | 318/255 |
| 8,265,793 B2* | 9/2012 | Cross et al. | 700/259 |
| 8,374,721 B2* | 2/2013 | Halloran | A47L 5/30 |
| | | | 700/245 |
| 2002/0022979 A1* | 2/2002 | Whipp | G06Q 10/02 |
| | | | 705/5 |
| 2002/0061758 A1* | 5/2002 | Zarlengo | G01D 21/00 |
| | | | 455/517 |
| 2002/0198654 A1* | 12/2002 | Lange | G01C 21/00 |
| | | | 701/400 |
| 2003/0023987 A1* | 1/2003 | Hiramoto et al. | 725/141 |
| 2003/0093199 A1* | 5/2003 | Mavreas | G07C 5/008 |
| | | | 701/31.4 |
| 2003/0189589 A1* | 10/2003 | LeBlanc | G11B 27/031 |
| | | | 715/723 |
| 2004/0098745 A1* | 5/2004 | Marston | H04N 7/106 |
| | | | 725/73 |
| 2004/0160907 A1* | 8/2004 | Perlman | H04L 63/0428 |
| | | | 370/319 |
| 2004/0185777 A1* | 9/2004 | Bryson | H04L 67/325 |
| | | | 455/41.1 |
| 2004/0204029 A1* | 10/2004 | Parry | H04W 88/06 |
| | | | 455/552.1 |
| 2005/0055147 A1* | 3/2005 | Hrazdera | A01B 79/005 |
| | | | 701/50 |
| 2005/0125085 A1* | 6/2005 | Prasad | G05B 19/0423 |
| | | | 700/83 |
| 2005/0149204 A1* | 7/2005 | Manchester | H04L 29/06 |
| | | | 700/1 |
| 2005/0156794 A1* | 7/2005 | Theobold | H01Q 1/007 |
| | | | 343/702 |
| 2005/0159832 A1* | 7/2005 | Umeo et al. | 700/94 |
| 2005/0187677 A1* | 8/2005 | Walker | 701/16 |
| 2006/0026017 A1* | 2/2006 | Walker | 705/1 |
| 2006/0189311 A1* | 8/2006 | Cromer | H04W 48/16 |
| | | | 455/434 |
| 2006/0206246 A1* | 9/2006 | Walker | 701/16 |
| 2006/0259266 A1* | 11/2006 | Bizet et al. | 702/119 |
| 2007/0005304 A1* | 1/2007 | Celestini | G05B 23/0221 |
| | | | 702/188 |
| 2007/0073800 A1* | 3/2007 | Rothman et al. | 709/202 |
| 2007/0076593 A1* | 4/2007 | Sakurai | B60W 50/0205 |
| | | | 370/219 |
| 2007/0143398 A1* | 6/2007 | Graham | 709/204 |
| 2007/0197261 A1* | 8/2007 | Humbel | G06Q 30/00 |
| | | | 455/558 |
| 2007/0233378 A1* | 10/2007 | Tanaka | G01C 21/3664 |
| | | | 701/456 |
| 2007/0234224 A1* | 10/2007 | Leavitt et al. | 715/762 |
| 2007/0261125 A1* | 11/2007 | Ginter et al. | 726/27 |
| 2007/0294033 A1* | 12/2007 | Osentoski | G08G 1/205 |
| | | | 701/29.3 |
| 2008/0049779 A1* | 2/2008 | Hopmann et al. | 370/431 |
| 2008/0100250 A1 | 5/2008 | Norman et al. | |
| 2008/0134237 A1* | 6/2008 | Tu et al. | 725/38 |
| 2008/0167796 A1* | 7/2008 | Narayanaswami | |
| | | | G01C 21/3611 |
| | | | 701/532 |
| 2008/0201644 A1* | 8/2008 | Partani et al. | 715/740 |
| 2008/0219274 A1* | 9/2008 | Kato | H04L 12/4625 |
| | | | 370/401 |
| 2008/0263628 A1* | 10/2008 | Norman et al. | 726/1 |
| 2008/0269949 A1* | 10/2008 | Norman et al. | 700/248 |
| 2008/0320402 A1* | 12/2008 | Isenmann et al. | 715/762 |
| 2009/0019141 A1* | 1/2009 | Bush et al. | 709/223 |
| 2009/0037033 A1* | 2/2009 | Phillips | G05D 1/0088 |
| | | | 701/2 |
| 2009/0176417 A1* | 7/2009 | Rembach | B63H 21/20 |
| | | | 440/6 |
| 2009/0254671 A1* | 10/2009 | Richard et al. | 709/230 |
| 2009/0259339 A1* | 10/2009 | Wright | B25J 9/0003 |
| | | | 700/264 |
| 2009/0300137 A1* | 12/2009 | Tyhurst et al. | 709/217 |
| 2009/0307395 A1* | 12/2009 | Umeo et al. | 710/61 |
| 2010/0049879 A1* | 2/2010 | Leavitt et al. | 710/14 |
| 2010/0097239 A1* | 4/2010 | Campbell et al. | 340/825.25 |
| 2010/0286839 A1* | 11/2010 | Iaquinangelo et al. | 700/295 |
| 2010/0306667 A1* | 12/2010 | Umeo et al. | 715/740 |
| 2011/0029244 A1* | 2/2011 | Lagmanson et al. | 702/6 |
| 2011/0035476 A1* | 2/2011 | Imbimbo | G08G 1/091 |
| | | | 709/222 |
| 2011/0106339 A1* | 5/2011 | Phillips | G05D 1/0278 |
| | | | 701/2 |
| 2011/0167154 A1* | 7/2011 | Bush et al. | 709/224 |
| 2011/0256800 A1* | 10/2011 | Jennings | G01S 1/7034 |
| | | | 446/456 |
| 2012/0078442 A1* | 3/2012 | Young et al. | 701/2 |
| 2012/0159596 A1* | 6/2012 | Vandevelde | H01L 31/02021 |
| | | | 726/7 |
| 2013/0035806 A1* | 2/2013 | Cross et al. | 700/259 |
| 2014/0200765 A1* | 7/2014 | Waeller | H04L 12/282 |
| | | | 701/36 |
| 2017/0006479 A1* | 1/2017 | Smith | H04W 24/02 |
| 2017/0006483 A1* | 1/2017 | Attanasio | H04L 67/125 |

OTHER PUBLICATIONS

Liao, C.; Liu, Q.; Kimber, D. and Lertsithichai, S., "A Tele-robot Assistant for Remote Environment Management", 2004, IEEE International Conference on Multimedia and Expo (ICME).*

Nguyen, L.A.; Bualat, M., Edwards, L.J., Flueckiger, L.; Neveu, C.; Schwehr, K.; Wagner, M.D. and ZBinden, E., "Virtual Reality Interfaces for Visualization and Control of Remote Vehicles", 2001, Autonomous Robots, vol. 11, pp. 59-68, Kluwer Academic Publishers.*

Skubic, M.; Anderson, D.; Blisard, S.; Perzanowski, D. and Schultz, A., "Using a Hand-Drawn Sketch to Control a Team of Robots", Mar. 2006, Springer Science and Business Media.*

Rodriguez, F.; Khamis, A.; Barber, R. And Salichs, M., "A Remote Laboratory for Teaching Mobile Robotics", Nov. 2001, IFAC TA.*

Sell, R. and Otto, T., "Remotely Controlled Multi Robot Environment", Jun. 2008, 19$^{th}$ Annual EAEEIE Conference.*

(56) References Cited

OTHER PUBLICATIONS

Wilczynski, V. and Flowers, W., "First Robotics Competition: University Curriculum Applications of Mobile Robots", 2006, Intl. Journal Engineering Ed., vol. 22, No. 4, pp. 792-803.*

Wilczynski, V. and Jennings, J.J., "Creating Virtual Teams for Engineering Design", 2003, Intl. Journal Engineering Ed., vol. 19, No. 2, pp. 316-327.*

Seo, S.-H.; Moon, T.-Y.; Kim, J.-H.; Hwang, S.-H. and Jeon, J.W., "Smart Vehicle Management System by using Gateway, Hand-set and VMP", Oct. 17-20, 2007, Intl. Conf. on Control, Automation and Systems.*

Nguyen, L.A.; Edwards, L.J.; Flueckiger, L.; Nevue, C.; Schwehr, K.; Wagner, M.D. and Zbinden, E.,"Virtual Reality Interfaces for Visualization and Control of Remote Vehicles", 2001, Autonomous Robots, 11, 59-68.*

Christian Schmitz, "Wireless Networks for Mobile Robots", Feb. 2005, Thesis, University of Applied Sciences Koblenz Department of Electrical Engineering and Information Technology. (Year: 2005).*

Alar Kuusik, Takeo Hisada, Satoshi Suzuki, Katsuhisa Furuta, "Cellular Network Telecontrolled Robot Vehicle", 2004, IFAC Telematics Applications in Automation and Robotics, Espoo, Finland, 2004. (Year: 2004).*

IEEE, "IEEE 802.11, The Working Group Setting the Standards for Wireless LANs", 2019, Retrieved from the IEEE Internet Website. (Year: 2019).*

Brian Keith Tyler, "A Comparative Analysis of Fortress (ES520) and Mesh Dynamics' (4000 Series) Networking Capabilities During Coasts 2007 Field Experiments", Mar. 2008, Thesis Naval Postgraduate School. (Year: 2008).*

John Paul Richerson, "The Extension of Wireless Mesh Networks via Vertical Takeoff and Landing Unmanned Aerial Vehicles", Dec. 2007, Thesis Naval Postgraduate School. (Year: 2007).*

International Search Report with Written Opinion, dated Jul. 21, 2011, received in international patent application No. PCT/US09/40830, 7 pgs.

International Preliminary Report on Patentability and Written Opinion, dated Sep. 1, 2011, received in international patent application No. PCT/US2009/040830, 5 pgs.

* cited by examiner

MANAGEMENT OF REMOTELY CONTROLLED DEVICES

CROSS REFERENCE TO RELATED APPLICATIONS

The present application is a Non-provisional application which claims priority from U.S. Provisional Patent Application Ser. No. 61/124,318, filed Apr. 16, 2008 and entitled Systems, Apparatus, and Methods for the Management and Control of Remotely Controlled Devices, and U.S. Provisional Patent Application Ser. No. 61/194,988, filed Oct. 2, 2008 and entitled Systems, Apparatus, and Methods for the Management and Control of Remotely Controlled Devices, both of which are incorporated herein by reference in their entireties.

TECHNICAL FIELD

The present invention relates to management and control systems for remotely controlled devices and more particularly, to systems and methods for the management and control of access to remotely controlled devices.

BACKGROUND INFORMATION

Remotely controlled devices and remotely control systems are known in the prior art. Typically there is a one-to-one ratio between the number of remote controls and remotely controlled device. In cases where there are multiple remotely controlled devices, there may be one remote control that controls all the remotely controlled devices. Some of these remote controls have included one that may only control one device at a time as each remotely controlled device has its own remote control signal receiver. In these remote controls, the sole signal transmitter cycles between the different devices.

Other types of remotely controlled devices and remote control systems have included a plurality of remotely controlled devices coupled to one master device. The remote control controls the master device, which in turn controls the other devices. Essentially, the remote control controls the plurality of devices via a tandem setup to the master device.

Another type of remote control system for controlling remotely controlled devices is one having a field controller that communicates with each individual remotely controlled device by communicating with the remote control for that remotely controlled device. In this system, the field controller may enable or disable remote control access to a remotely controlled device by sending a disable or enable signal to the remote control for that remotely controlled device. The remote control may respond by relaying the signal to the remotely controlled device or by enabling or disabling communications to the remotely controlled device.

Accordingly, there is a need for an improved remote control system, apparatus, and methods that allows for direct management and control of a plurality of remotely controlled devices. Further, there is a need for an improved remote control system, apparatus, and methods that allows for expanded management and control functionality, increased flexibility, and/or enhanced safety features.

SUMMARY

In accordance with one aspect of the present invention, a system for controlling remote control access to a remotely controlled device is disclosed. The system includes a driver interface, a remotely controlled device, and a field management system having an internal router. A driver interface is coupled to and controls a corresponding remotely controlled device. A field management system is coupled to each of the remotely controlled devices and may send signals enabling, disabling, changing the operational mode of, or otherwise controlling the remotely controlled devices directly to the remotely controlled device.

In one exemplary embodiment, a system for controlling remote control access has a driver interface having one or more user input mechanisms, such as, by way of example, a joystick or gaming control, or peripheral computer, one or more remotely controlled devices such as remote controlled robots, and a field management system having an internal router. One or more driver interfaces is communicably coupled via wireless connection or tethered connection to one or more remotely controlled devices. A field management system is also communicably coupled to the one or more remotely controlled devices via a wireless router on the one or more remotely controlled devices. In various embodiments, a field management may also be communicably coupled to the one or more driver interfaces via wireless connection or tethered connection. The remotely controlled device may also have a remotely controlled device controller, a peripheral interface, a power source, a field management system interface, peripheral interface, peripheral interface modules, and/or other components. Signals from the field management system are received by the field management system interface that controls the distribution of power to the peripheral interface modules that may interrupt or modify communication between the driver interface and the one or more remotely controlled devices communicably coupled to that driver interface. Alternatively, signals from the field management system that are received by the field management system interface may provide direct commands to the remotely controlled devices such as instructions to enable and/or disable themselves and switch between various operating modes. In various embodiments, these operating modes may include autonomous operation, in which the remotely controlled device executes instructions that it has been provided previously, and driver controlled operation. In various further embodiments, signals from the field management system that are received by the field management system interface may provide direct commands to the driver interface to enable, disable, or change the operating mode of the remotely controlled device. In certain of such embodiments, the driver interface may respond to such comments by passing the commands to the remotely controlled device for execution by the remotely controlled device.

Some embodiments of this aspect of the invention may include one or more of the following. The remotely controlled device may have a remotely controlled device controller that is in communication with a wireless gaming adapter or similar device. The wireless gaming adapter is communicably coupled to the driver interface, allowing driver interface control of the remotely controlled device. The remotely controlled device may also have an Ethernet hub which is in communication with a field management system. The field management system may be located in a variety of positions within the system, including, by way of example, as a separate physical unit or combined with one more of the other system elements. The remotely controlled device may have a wireless gaming adapter communicably coupled to the remotely controlled device controller, which is directly coupled to the field management system.

Further, some embodiments of this aspect of the invention may include one or more of the following. The system for controlling remote control access to a remote controlled device may include a key or other indication device, such as the types of keys that would be used to start a car, smart keys, or other electronic devices. The key may provide the enable/disable signal to the remotely controlled device. Instead of sending a wireless enable/disable signal to the remotely controlled device, the signal is placed on the key and then inserted into the remotely controlled device and relayed to the peripheral interface or the gaming adapter communicably coupled to the driver interface.

In accordance with another aspect of the present invention, a method for controlling remote control access to a remotely controlled device is disclosed. The method includes providing at least one remotely controlled device, communicatively coupling the at least one remotely controlled device to a respective driver interface, communicatively coupling the at least one remote remotely controlled device to a field management system, sending a signal from the field management system directly to the at least one remotely controlled device, the signal modifying control by the driver interface of the at least one remotely controlled device and modifying power to the remotely controlled device.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

General System

Figure 1:
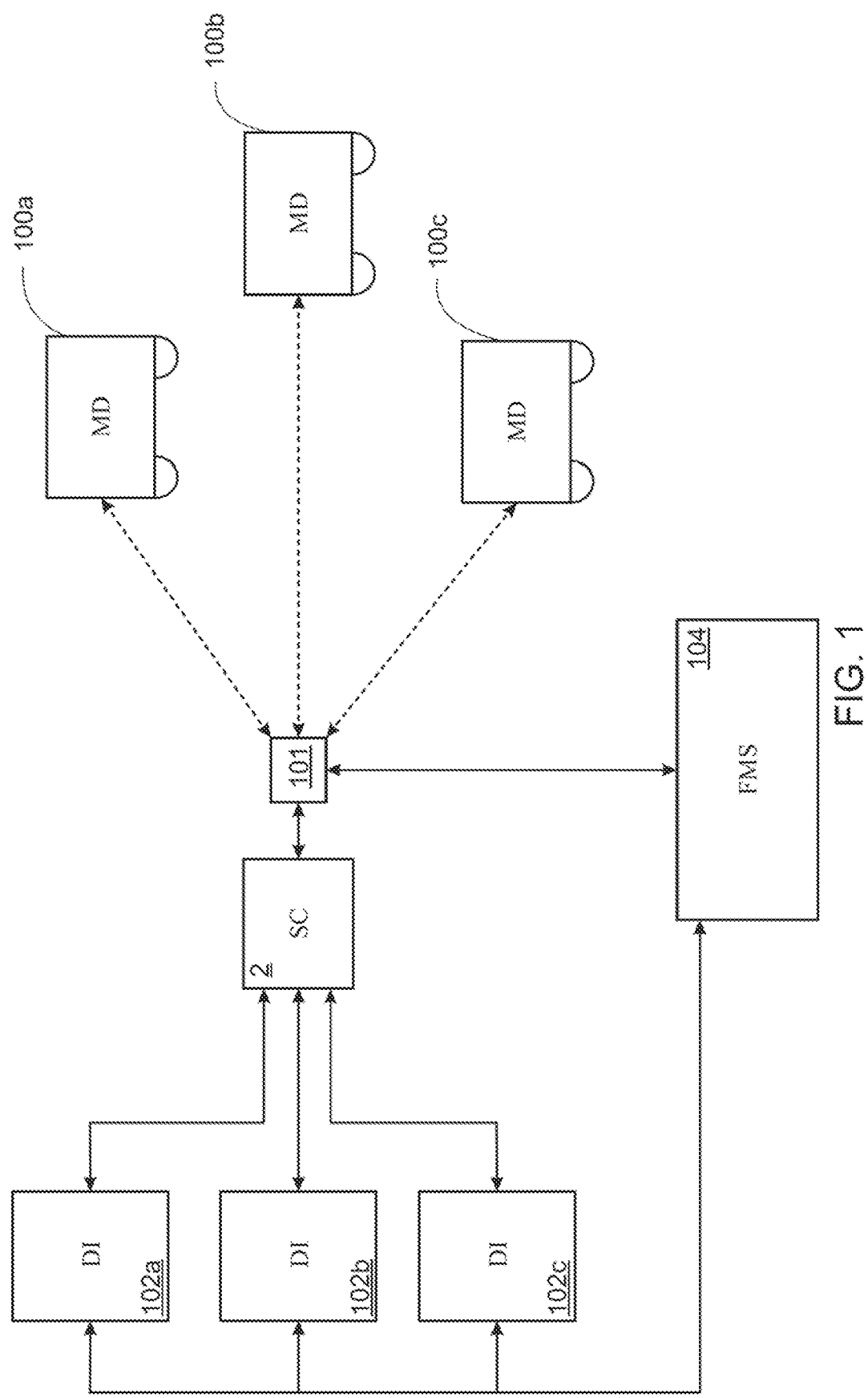
FIG. 1 is a diagrammatic representation of the system for controlling remote control access to a remote controlled device.

Referring to FIG. 1, an exemplary embodiment in accordance with one aspect of the present invention for systems, apparatus, and methods for managing and controlling remote control access to remote controlled devices includes at least one remote controlled remotely controlled device 100 (also referred to as 100a, 100b, 100c, 100d, but, collectively, throughout this description, as 100) at least one driver interface module 102 (also referred to as 102a, 102b, 102c, 102d, but, collectively, throughout this description, as 102), a field management system 104, a wireless access point 101, and at least one station control 2. In certain embodiments, each driver interface module 102 may be communicatively coupled to a station control 2. A wireless access point 101, coupled to a station control 2, may transmit user control data, such as data originating from a driver interface module 102, to a corresponding remotely controlled device 100. In various embodiments, wireless access point 101, may be used for a variety of function, including, by way of example, monitoring transmissions from the remotely controlled device for safety, diagnostics, data logging, and the like. A wireless access point 101 may also receive feedback data from the remotely controlled devices 100 and forward it to the driver interface module 102 associated with a corresponding remotely controlled device 100. Further, the wireless access point 101 may be used to monitor the quality of incoming and outgoing data transmissions.

To facilitate data transfer in this system, any type of wireless protocols may be utilized, including, for example, any of the types of wireless communication protocols commonly utilized for remote control of mechanical devices. For example, but not limited to, standard wireless protocols such as, but not limited to, 802.11a/b/g/n (or any other type of 802.11 protocol), ZigBee, ZigBee Pro (or any ZigBee related protocol) and/or BLUE TOOTH may be implemented.

In various embodiments, the technical aspects of the IEEE 802.11 standard may prove beneficial. For example, the technical aspects of the IEEE 802.11a standard may prove beneficial in a variety of applications, including, but not limited to, control of remotely controlled devices in conjunction with a robotics competition, such as the FIRST Robotics Competitions (see www.usfirst.org). 802.11a is a wireless networking transmission protocol that typically operates in the 5 GHz band and uses a 52-subcarrier orthogonal frequency division multiplexing (OFDM) digital modulation technique to produce a peak theoretical data rate of 54 Mbit/s. Typically, realistic data rates are typically in the 20 Mbit/s range. In various embodiments, utilization of the 802.11a standard, which operates in the 5 GHz band, may be advantageous because a number of other wireless protocols use the 2.4 GHz band. Thus, utilization of the 802.11a standard may result in less interference from other signals. Additionally, in such embodiments, 802.11a has a network capacity of 24 or more channels which may yield significant aggregate bandwidth advantages over similar protocols, particularly when control of a number of remotely controlled devices is desired. Further, the range of the 802.11a wireless signal is approximately 35 Meters indoors. As competitions involving remotely controlled devices, such as robots, are typically held in expansive indoor settings, such as domes or gymnasiums, which may, in some instances, mimic the outdoor conditions, the 802.11a signal is likely to approach its approximate outdoor radius, i.e., the signal may have an outdoor-like range even in an indoor setting.

Alternatively, any type of standard or custom wireless or mobile protocols, such as, but not limited to, by way of further example, any type of protocol based on one or more of the following: 3G, GSM, PHS, 4G, HCSD, TACS, CDMA, HSDPA, TDMA, CDMA2000, iDEN, TD-SCDMA, EV-DO, Mobitex, UMTS, FDMA, NMT, WCDMA, GAN, PCS, WiDEN, GPRS, PDC, and WiMAX. Wireless protocols may be selected based on power usage, signal strength, the number of signals that may need to be transmitted at any given time, the security of the protocol, and/or a number of other factors that may be apparent to those of skill in the field. Alternatively, one type of wireless protocol may be used for transmission from one system component to another, while a second type of wireless protocol may be used for transmission between two different system components, and so on for a third, fourth or more type of wireless protocols.

One aspect of a field management system 104 may be a server component. A server may function as a centralized processing unit for the field management system 104 which may be capable of, but not limited to, signal processing, error checking/reporting, network management, event control, sounding alarms, autonomous operation, statistical logging/reporting, interfacing with outside networks (such as the Internet), and/or other functions associated with management and control of one or more remotely controlled devices 100 (also referred to as 100a, 100b, 100c, 100d, but, collectively, throughout this description, as 100). In the exemplary embodiment, a server may include a 3.2 GHz Intel Pentium D processor, 1 GB RAM, 80 GB storage space, Microsoft Windows Server 2003 w/Service Pack 1, dual video cards, a soundcard and audio output interface. In other various embodiments, a field management system server component may operate on a more basic level and include a less sophisticated hardware configuration than the exemplary embodiment.

In various embodiments, a field management system 104 may be communicatively coupled to each driver interface module 102 (also referred to as 102a, 102b, 102c, 102d, but, collectively, throughout this description, as 102) in a manner that allows the field management system 104 to directly enable, disable, or modify communication between a driver interface module 102 and a corresponding remotely controlled device 100. Alternatively, more than one field management systems 104 may be used. In such embodiments, certain components of the driver interface modules would be communicatively coupled to one field management system, while other driver interface modules would be communicatively coupled to other field management systems.

In various embodiments, the field management system 104 may also enable, interrupt, or modify communication between a driver interface 102 and its associated one or more remotely controlled devices 100, thereby controlling the ability of a driver interface module 102 to control the one or more remotely controlled devices 100 associated with that driver interface module 102. By way of example, a watchdog timer located on the remotely controlled device 100a may initiate a disabled power state after loss or significant degradation of a wireless signals from the field management system 104.

Figure 2:
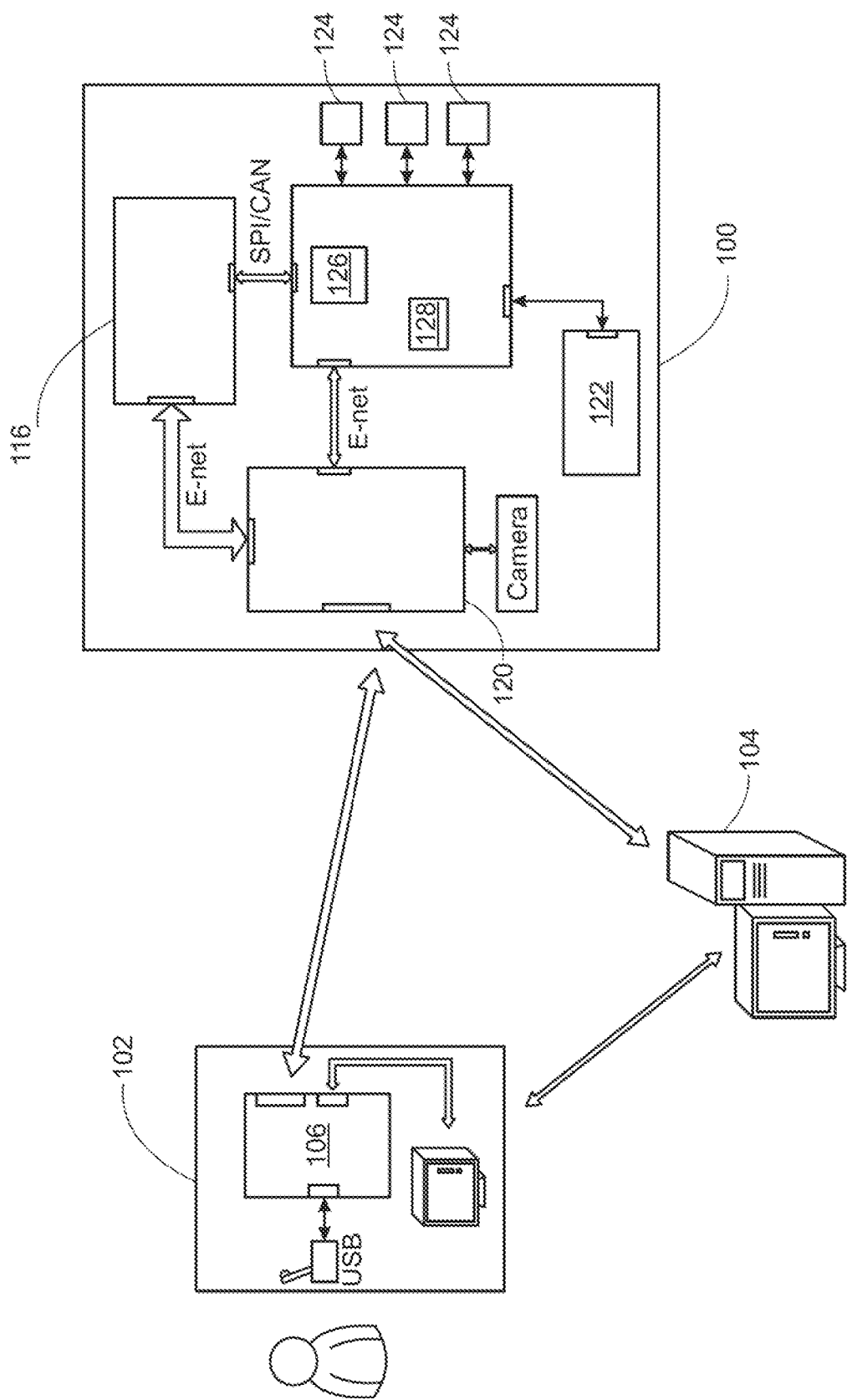
FIG. 2 is an exemplary diagram of the system for controlling remote control access to a remote controlled device.

Referring to FIGS. 1 and 2, in accordance with certain aspects of the present invention, field management system 104 may control driver interface's 102 power of, control of, and communication with a remotely controlled device 100a by sending enable, disable, autonomous, or emergency-stop signals directly to remotely controlled device 100 or indirectly through driver interface module 102. The remotely controlled device 100 then receives the signal. If the signal is for power shut off (emergency-stop), the field management system 104, driver interface module 102, or remotely controlled device controller 100 may relay die message to peripheral interface 118 which interprets the signal and shuts power off from the power source 122 to the peripheral interface modules 124 (such as motors, drivers, and other similar interfaces) and/or the remotely controlled device controller 116 of the remotely controlled device 100.

In various embodiments, the field management system 104 may also exert more specific control over one or more remotely controlled devices, such as remotely controlled device 100. For example, driver interface module 102 commands may be mimicked by the field management system 104 to fully operate a remotely controlled device 100. In such embodiments, one field management system 104 may mimic commands from a set of one or more driver interface modules 102 to control the operation of a set of one or more remotely controlled devices 100, while a further field management 104 system may be used to mimic commands from a another set of one or more driver interface modules 102 to control the operation of another set of one or more remotely controlled devices 100. The aforementioned exemplary embodiment may be used, by way of further example, to replay matches, debug remote control operation, debug system errors, and to simulate interactions between remotely controlled devices 100.

In various embodiments, a field management system 104 may operate as a monitor to ensure that each remotely controlled device 100 is operational. Further, a field management system 104 may mediate the competition as a whole by monitoring connections between components, the operational status of components, and/or wireless traffic propagated throughout the system. In the event an anomaly surfaces during the competition, a field management system 104 may autonomously correct or mitigate the situation. For example, a remotely controlled device 100 may automatically be disabled where integral remotely controlled device subsystems fail to respond to user input. In yet a further example, a remotely controlled device 100 may be automatically disabled for a specific period of time, which period of time may be the remaining period of the competition, in situations where the remotely controlled device, or a human operator operating the remotely controlled device, violates a competition rule or exceeds a preset parameter. An event manager, stationed at the field management system 104, may manually respond to displayed status information and manipulate all aspects of the competition.

In various embodiments, as a redundancy measure, the field management system 104 may be wirelessly coupled to each remotely controlled device 100 via a wireless access point 101. The field management system 104 may then directly monitor, operate, or disable a remotely controlled device 100a without communication through a driver interface module 102a. In alternative embodiments, the field management system 104 may be communicatively coupled to remotely controlled devices 100 via wireless access point not accessible to, or used by, driver interface modules 102.

In another alternative embodiment, the field management system 104 may be communicatively coupled to a station control 2. In this embodiment, control data generated from driver interface modules 102 may be monitored and manipulated as needed before transmission through a wireless access point 101.

In another alternative embodiment, the field management system 104 may be in a remote location, such as a different city, state or country. In this system, an Internet connection from the competition to the field management system 104 may provide all data needed to remotely manage the competition. The Internet connection may be accomplished through any of the standard means known to those of skill in the field.

Figure 9:
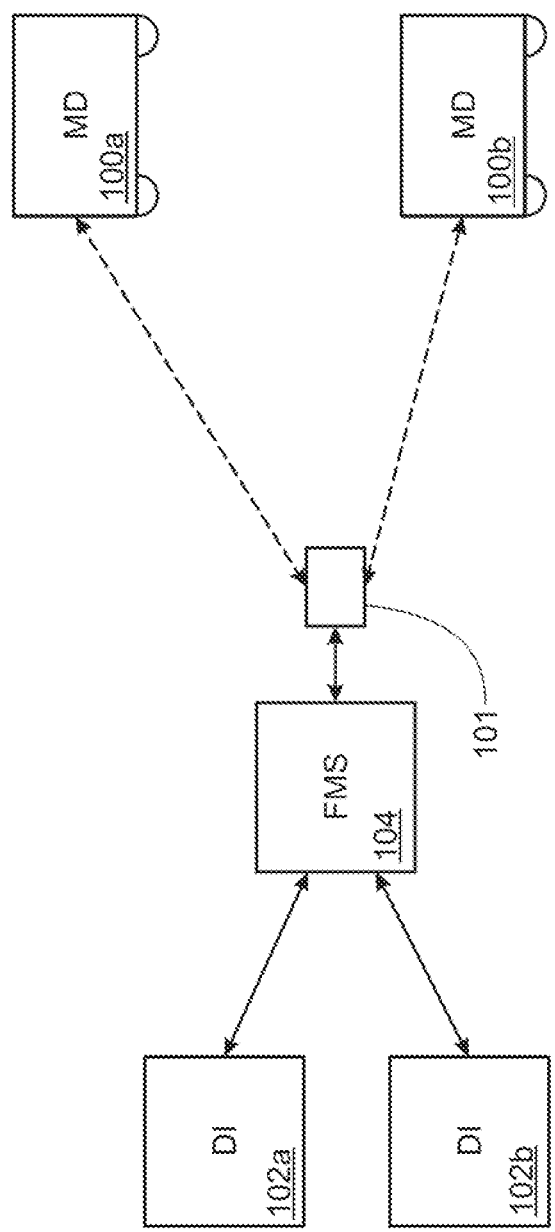
FIG. 9 is an exemplary diagram of a system for controlling a remotely controlled device through an intermediary component.

In another alternative embodiment, referring to FIG. 9, the field management system 104 may operate as the channel through which user control data is transferred to remotely controlled devices 100. In this embodiment, data is transferred to each remotely controlled device 100 through a wireless connection originating from a wireless access point 101 coupled to the field management system 104. Each remotely controlled device 100 is also communicatively coupled to field management system 104 in a manner that allows field management system 104 to directly interrupt or manipulate communication between a remotely controlled device 100 and its respective driver interface module 102 and to directly turn off the power to remotely controlled device 100.

Figure 6:
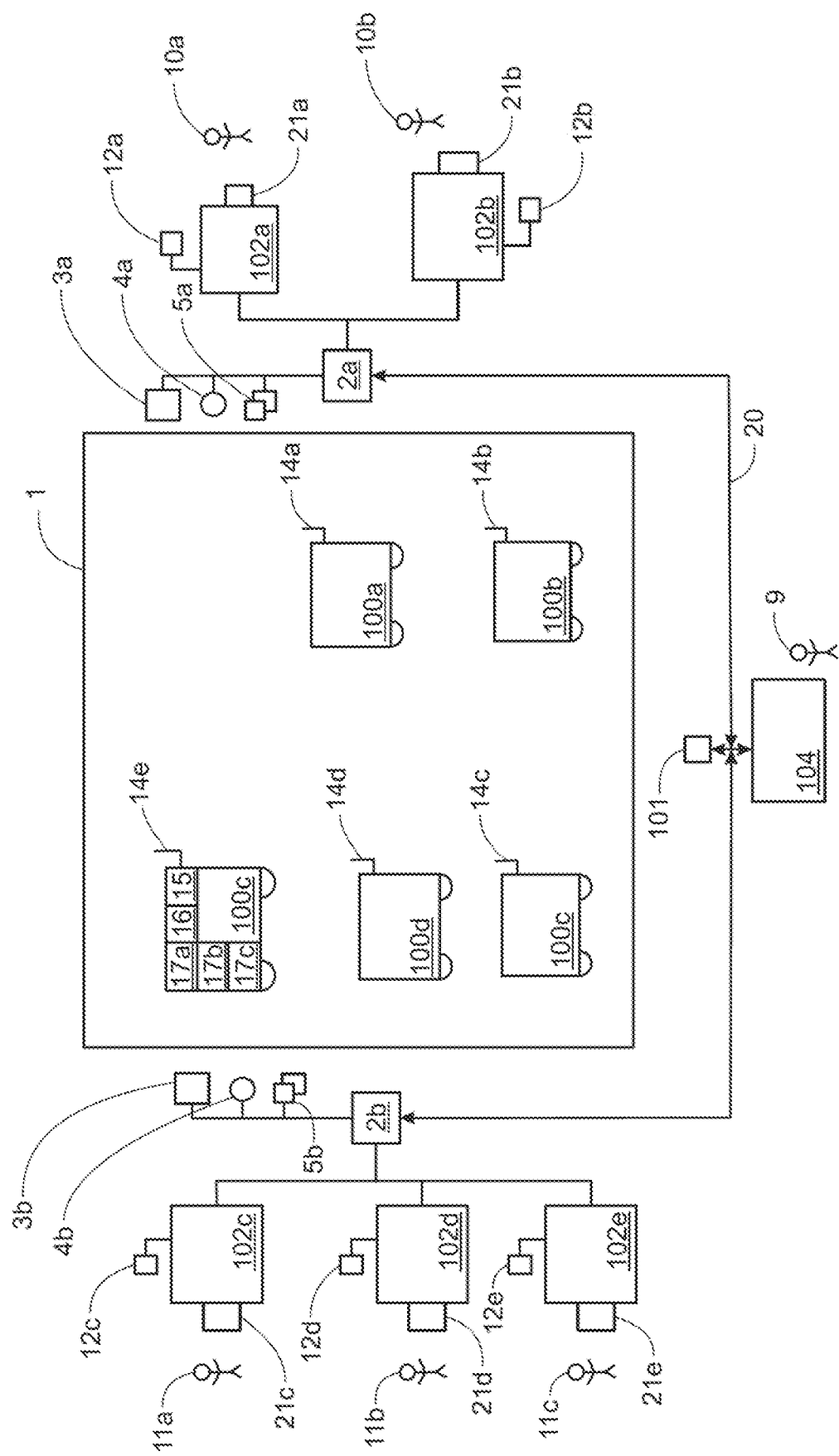
FIG. 6 is an exemplary diagram of a robot competition including a field with contestants.

FIG. 6 is an exemplary diagram of a robotics competition. This is one embodiment of a competition and the description is meant to describe one embodiment. In various additional embodiments, there may be a greater number or lower number of any one or more of the competition elements described below, including but not limited to, teams, players, displays, remotely controlled devices, etc. In another embodiment, for example, there may be six total teams, three sets of users and three sets of opposing users on the field 1. In various embodiments, the competition may contain at least one field 1 on which remotely controlled devices 100 interact, although various embodiments may use more or less remotely controlled devices. In variations of these embodiments, a given remotely controlled device 100 is operated by at least one user 10 (also referred to as 10*a* and 10*b* but collectively, throughout this description, as 10). A set of users 10 may compete with an opposing set of users, for example, and purposes of illustration, team 11 (also referred to as 11*a*, 11*b* and 11*c* but collectively, throughout this description, as 11) by manipulating one or more input devices 21 (also referred to as 21*a*, 21*b*, 21*c*, 21*d*, 21*e*, but collectively, throughout this description, as 21) coupled to a driver interface module 102. In various embodiments, each driver interface module 102 may be connected to a corresponding station control 2 (also referred to as 2*a* and 2*b* but collectively, throughout this description, as 2) which provides users 10 with a rapid means of connecting to a wireless access point 101. The subsystems of station controls 2 may frequently change to meet the requirements of the competition; generally, however, a station control 2 may contain an Ethernet switch, power supply, relays, logic controllers, and/or a diagnostic interface for verifying Ethernet traffic. In various embodiments, a station control 2 may also function as a localized interface to team gates, sensors, signal transmitters, or status indicators (collectively "site player components"). Site player components may include, by way of example: a team display, such as LED 3 (also referred to as 3*a* and 3*b* but collectively, throughout this description, as 3) for display of team identification number; display for display of other team characteristics, such as the team name, nickname, mascot, slogan, symbol, track records in the given competition, track record throughout the given competition season, the alliance of which is team is a part, and/or the number of years the team has played; a team light 4 (also referred to as 4*a* and 4*b* but collectively, throughout this description, as 4) providing information on the operational status of the respective team; and a timer display, such as LED 5 (also referred to as 5*a* and 5*b* but collectively, throughout this description, as 5) for displaying remaining time in a given match. In various other embodiments, further displays such as the match number and real time clock may be utilized. In various other embodiments, the station control 2 may be utilized to control on-field actuators, ball drops, various types of emitters, video cameras, position detectors, scoring, field and/or robot status sensors (both manual and automatic). In yet further embodiments, station control 2 may be utilized to support, monitor, referee, or control communication and cooperation between two or more remotely controlled devices, between any field component and a remotely controlled device, and between two or more field components. Throughout this description, although LED is used as an example of a display, in various other embodiments, additional or alternative types of displays may be used.

Still referring to FIG. 6, in various embodiments, the field management system 104 may receive user control data over a physical Ethernet connection 20. In such embodiments, a wireless access point 101 may be used to bridge the gap between wireless transceivers 14 (also referred to as 14*a*, 14*b*, 14*c*, 14*d*, but collectively, throughout this description, as 14), coupled to each remotely controlled device 100, and the driver interface modules 102 and/or field management system 104. An individual remotely controlled device 100*a* may contain a remotely controlled device controller 15, peripheral interface 16, and any number of peripheral interface modules 17 (also referred to as 17*a*, 17*b*, and 17*c* but collectively, throughout this description, as 17), which are shown here only with respect to remotely controlled device 14*e* by way of example only.

In a competition setting, the field manager 9 monitors the competition and reserves the ability to send enable, disable, autonomous, and emergency-stop signals to individual or all remotely controlled devices 100. Alternatively, signals generated from the field management system 104 may be channeled through one or more driver interface modules 102 to remotely controlled devices 100. In such embodiments, teams may have access to emergency-stop switches 12 (also referred to as 12*a*, 12*b*, 12*c*, 12*d*, 12*e* but collectively, throughout this description, as 12) coupled to their respective driver interface modules 102 (either directly or indirectly through an additional system component, such as station control 2). Because the field 1 may contain a number of remotely controlled devices 100, the field manager 9 may not always be cognizant of a need to dispatch priority signals. Thus, user access to the emergency-stop signal may be an important safety feature of various embodiments of the invention.

In various other embodiments, redundant connection of emergency-stop switches to both station control cabinet 2 and driver interface modules 102 may be provided. In such embodiments, the redundant connections provide additional security when one or both devices are malfunctioning by alerting the field management system 104. In such instances, field management system 104 may issue a disable command directly to each of the remotely controlled devices on the field or to wireless access point 101.

Figure 12:
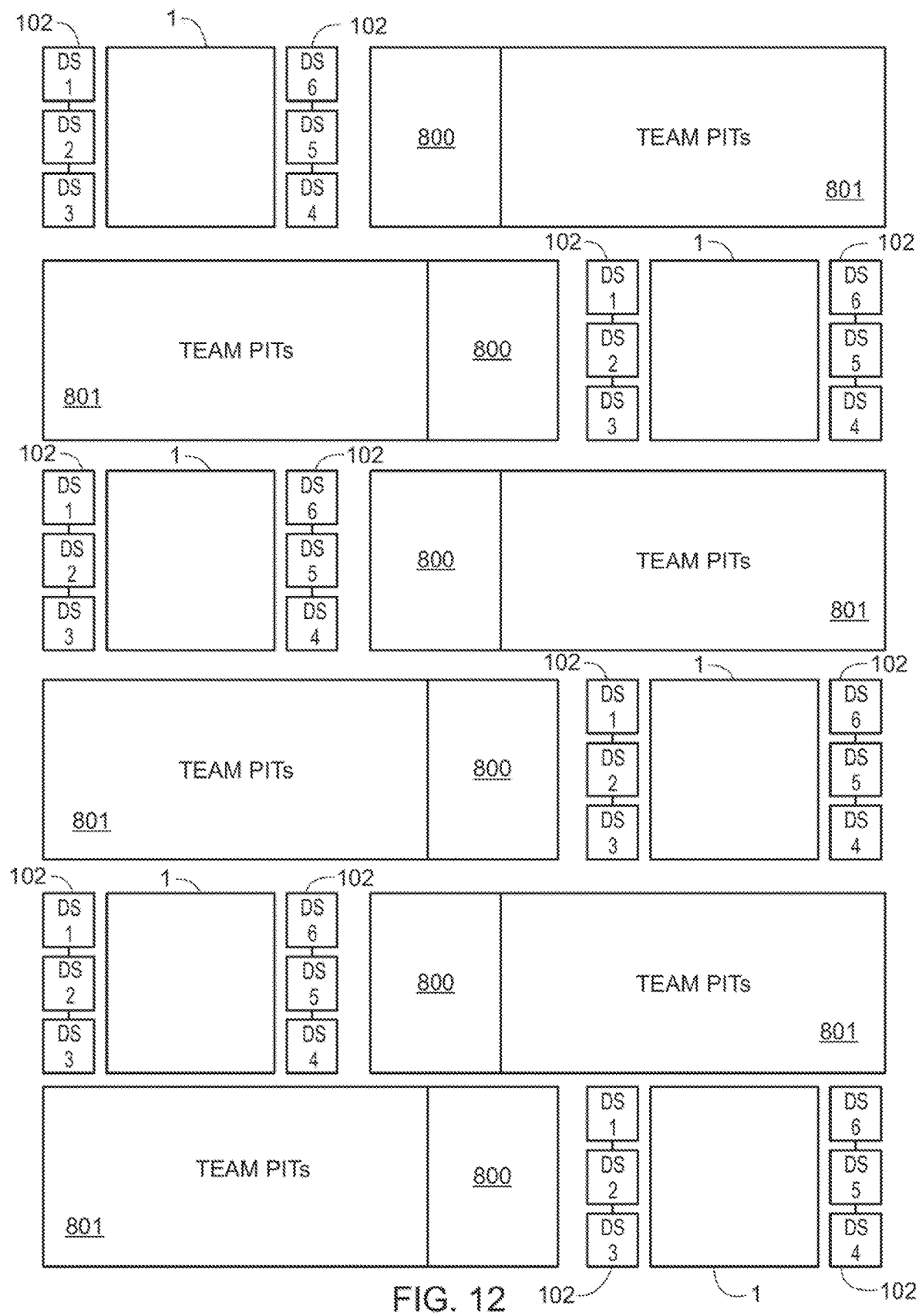
FIG. 12 is an exemplary field layout of a remotely controlled device competition.

In various embodiments, referring to FIG. 12, an Inspection Station 800 may be combined with one or more of the systems elements described above. In further embodiments, the Inspection Station 800 may be used to assign IP addresses or other system security codes by which a remotely controlled device may be recognized by the associated system components. Additionally, in certain embodiments, the Inspection Station 800 may, by way of further example, check team numbers, check to ensure that the mobile robot complies with various competition requirements, such as for example, determining if the remotely controlled device has the latest version of code, has certain required code modules, does not contain certain forbidden code modules, has each required system apparatus, does not have any forbidden system apparatus, and to ensure that the remotely controlled device is functioning within given system parameters required for competition. In various embodiments, such type of information may be provided automatically via wired or wireless networking to the field management system 104 for high-level competition control, database update, or other organizational purposes.

In various embodiments, the Inspection Station 800 may provide all of the abovementioned services from a location within a pit area 801. By way of example, a team may bring a remotely controlled device into a pit area 801 wherefrom repair work or general tuning may be undertaken in preparation for a robotics competition. While still in the pit area 801, a remotely controlled device may be further serviced at the Inspection Station 800, resulting in a competition-ready remotely controlled device at the time of exiting the pit area.

Still referring to FIG. 12, in various embodiments in the context of a remotely controlled device competition, pitting areas 801 may be aligned adjacent to a corresponding field 1 in such a way that minimizes radio frequency interference and/or generally enhances the operation of the event. By way of example, a championship setup may consist of six fields 1 with corresponding pits 801 arranged in an alternating fashion such that no field 1 is directly adjacent to another field 1.

Remotely Controlled Device Generally

Remotely controlled device 100 may be any device capable of being controlled via a remote device or signal. A remotely controlled device 100 may include, but is not limited to, a robot, a remotely controlled model airplane, a remotely controlled toy car, a remotely controlled toy boat, or other remotely controlled device. In the exemplary embodiment, illustrated in FIG. 2, remotely controlled device 100 is a robot. In this embodiment, remotely controlled device 100 has a remotely controlled device controller 116, a peripheral interface 118, a router 120, a power source 122, and one or more peripheral interface modules 124.

Remotely controlled device 100 may utilize any of the wireless protocols described herein to allow wireless communication between components to the remotely controlled device. Such wireless network within remotely controlled device 100 may allow for the control of components at some distance from the main components of remotely controlled device 100, such as an arm, without traditional wiring and may allow for greater control and feedback (such as remote arm position, speed, direction, and derivatives of any of these).

In various embodiments, the wireless network may work in conjunction with a smart sensor device. In an exemplary embodiment, the device may be any device such as a Sun SPOT (Sun Small Programmable Object Technology), a wireless sensor network (WSN) mote developed by Sun Microsystems. Although a Sun SPOT device is described, it is only be way of an exemplary embodiment. In various embodiments, another device having similar functionalities may be used.

A Sun SPOT has the ability to wirelessly transmit to data to another Sun SPOT, an array of Sun SPOTs, or to a base station coupled to a computer. Wireless data transfer between Sun SPOT devices is accomplished using the IEEE 802.15.4 wireless standard and an onboard radio operating in the 2.4 GHz band. Sun SPOT devices may contain onboard sensors, such as accelerometers, light sensors, timers/counters, or temperature sensors, or other sensors capable of transducing physical data to digital signals.

Figure 10:
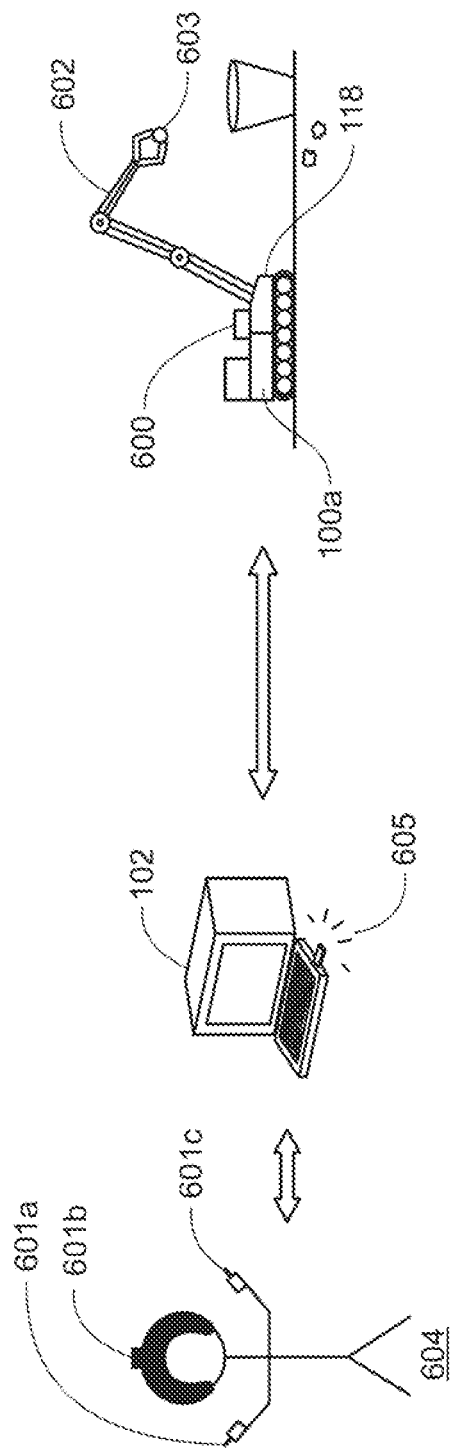
FIG. 10 is an exemplary diagram of a remotely controlled device operated, in part, through at least one smart sensor device.

In various embodiments, Sun SPOT devices may be programmed with custom software for controlling a remotely controlled device 100, such as a robot, or a subsystem of a remotely controlled device. By way of example, referring to FIG. 10, a team may mount a Sun SPOT 600 on a subsystem of a remotely controlled device 100, such as a robotic arm 602. Such a robotic arm 602 may be powered by the peripheral interface 118 and controlled by electric servo motors communicably coupled to output pins located on the robot-mounted Sun SPOT 600. In this example, a second, user-mounted Sun SPOT 601*c* may be attached to a glove, arm-band, helmet or other apparatus to transduce and transceive control data from a user 604. Control data, such as position, speed, and direction, may be gathered by the user-mounted Sun SPOT's onboard sensors and wirelessly transmitted to the robot-mounted Sun SPOT 600 for specific control of the robotic arm 602. Such an embodiment may allow a team member to manipulate objects, such as balls 603, barriers, other robots, or even realign another subsystem located on the robot (such as a vision sensor knocked off-center in the course of competition). In various embodiments, additional sensor devices may be used and are not limited only to the areas of the user as discussed above with respect to that example.

In certain embodiments, including the aforementioned control of a robotic arm, the team member 604 utilizing the user-mounted Sun SPOT 600 may be completely removed from physical connection to the driver interface module 102. This isolation may be accomplished by way of connecting a wireless dongle 605, a compact wireless transceiver, to a USB port on the driver interface module 102 and another dongle to the user-mounted Sun SPOT(s) 601*c*. In various embodiments, a wireless dongle 605 may be connected to a computer or laptop, where said computer or laptop may be communicably coupled to a driver interface module 102.

In various other embodiments, a team member 604 may mount more than one Sun SPOT in various locations on the user's body, such as head 601*b*, hands 601*a*, 601*c* or other bodily locations, to provide three-dimensional control over a robot 100*a* or a robot subsystem 602. Control signals may be generated through use of triangulation, or other positioning algorithm, between Sun SPOTs and/or use of onboard Sun SPOT accelerometer sensors.

In various other embodiments, a team may strategically place Sun SPOT devices, programmed for triangulation purposes, around the competition field and on a remotely controlled device. This configuration may allow a remotely controlled device, user, and/or field management system to gain a certain level of situational awareness regarding distance from the field bounds or relation in space to other remote controlled devices.

In various other embodiments, such a wireless network may also allow for robot to robot communication within an alliance or robots.

In certain embodiments, the field management system may monitor data transmitted between sun SPOT devices, or between sun SPOT devices and components employed for managing or controlling remotely controlled devices. Considering disparate wireless standards (sun SPOT-802.15.4; field management system network-802.11a), a separate receiver component may be used to facilitate harmonious transfer of data between networks. Additionally, the field management system may substitute, or control the flow of, data between such devices where appropriate.

Driver Interface Module

Figure 7:
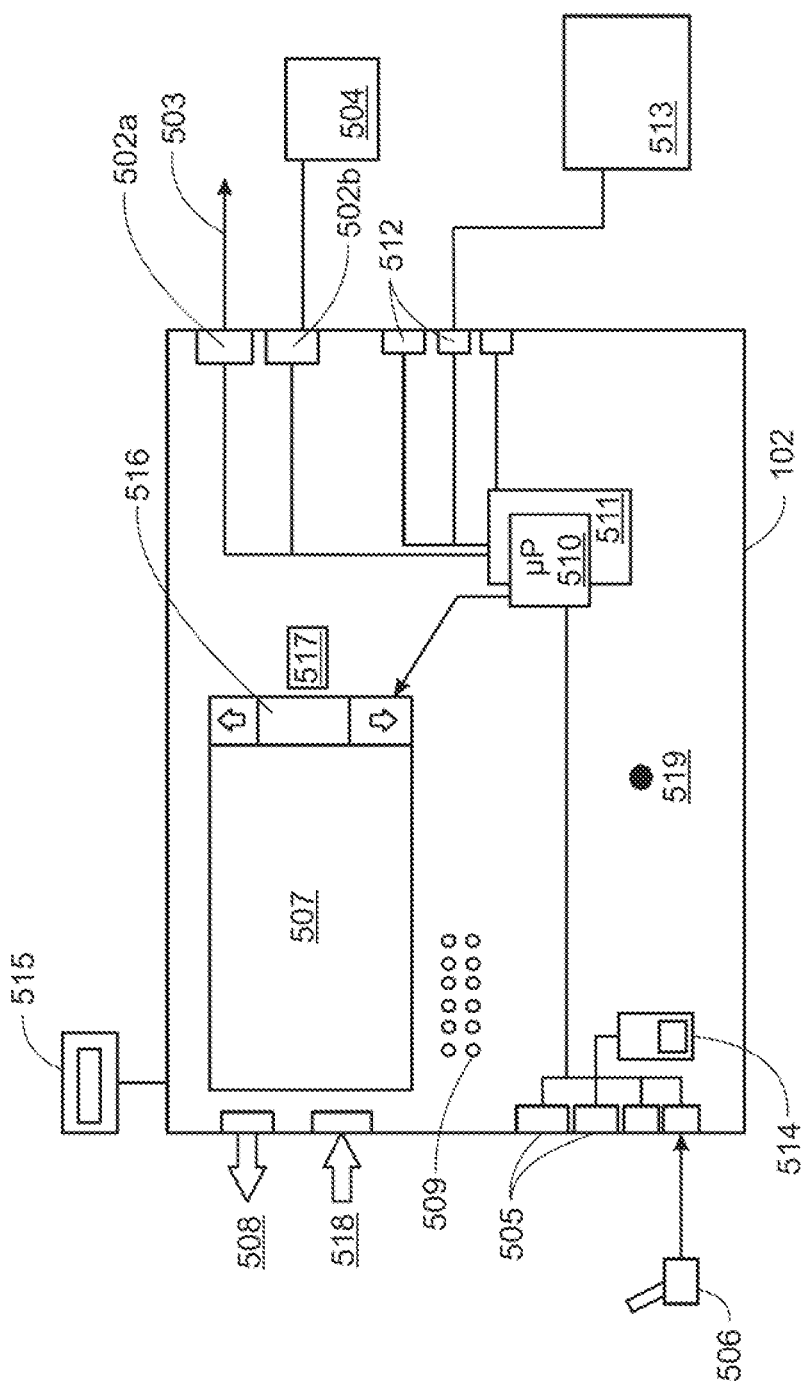
FIG. 7 is an exemplary diagram of the driver interface module used for user input.

Referring to FIG. 7, the driver interface module 102 may be used to buffer and transceive all input from the user and all output to the remotely controlled device. In the exemplary embodiment described herein, the driver interface module 102 may contain a 180 Mhz microprocessor 510, operating system, at least 8 MB of flash-based memory, and at least 32 MB SDRAM 511 to control the flow of data between the user and the remotely controlled device as well as display information to the user. However, in various other embodiments the driver interface module 102 may vary.

User input data may be input to the driver interface module 102 via any type of data connection. In various specific embodiments, user input data may be input to the driver interface module 102 by four or more 12 Mbps USB 2.0 or USB On-The-Go ports 505. The USB input ports 505 facilitate use of a range of devices to control the remotely controlled device. For example, Playstation, XBOX, Nintendo or other known gaming adapters 506 may be used to control the remotely controlled device. Custom control circuitry may also be connected through the USB ports 505. The driver interface module 102 may have additional analog and digital inputs/outputs 512 for teams that use custom interfaces 513. Although the field management system is given ultimate control over the signals sent to the remotely controlled device, the driver interface module 102 may contain a toggle switch 514 for autonomous/driver mode settings. As redundancy measure, the emergency-stop signal may also be provided through the driver interface module 102. The user may activate the emergency-stop signal via a pushbutton, switch or other similar device 515. In various embodiments, switch 515 is connected through any standard connection to the driver interface module 102.

Information is relayed back to the user through a graphical user interface (GUI) 507 located on the driver interface module 102. The GUI 507 provides the user with visual indications of operating status and fault/error codes provided by internal diagnostic systems of the driver interface module 102. The user may interact with the GUI 507 by using the scroll buttons 516 and at least one select button 517. The GUI may consist of one or more 128×64 Pixel LCD screens and an array of LEDs 509 for status indications. Information on the LCD 507 is managed by user-layer software running on the driver interface module's microprocessor 510. This software displays and manages user input and Ethernet feedback data stored in a structured data array within a memory module 511. The array may contain control, user, status and streaming video feed, or any other information the pilot needs to effectively operate the remotely controlled device. Although not essential, team scoring information or overall team status may also be displayed on the GUI 507 to smooth "gameplay". In various other embodiments, a separate laptop computer, PC, or other display may be provided that provides an additional GUI. In such embodiments, the additional GUI may be connected via the driver interface module 102 or control station 2.

Control data gathered from the USB ports 505 is sent to the remotely controlled device via a full duplex Ethernet connection 503. At least two Ethernet ports 502a, 502b on the driver interface module transceive user input data. One Ethernet port 502a is used to transceive user control data to the remotely controlled device via a wireless access point. A second Ethernet port 502b may be connected to a computer/laptop 504 acting as a "dashboard" to reflect status indicators to fellow teammates, or as a bus monitoring tool for monitoring/debugging Ethernet traffic or as a video display of streaming images from the remotely controlled device.

The driver interface module 102 may be supplied with power through a wall outlet 518 or through the field management system. In the event an error occurs within the driver interface module 102, the driver may reset the station by activating a reset button 519. The reset button 519 may reset power to the driver interface module or restart the operating system. The driver interface module 102 may contain at least one 5V power output port 508 for team use.

Regarding the external housing of the driver interface module 102, in certain specific embodiments, the driver interface module 102 may reside in its own enclosure as a freestanding module. The driver interface module 102 may be operated in an electrically hostile environment and may greatly benefit from physical and electrical isolated from all external components. Due to this potentially hostile environment, the driver interface module 102 may incorporate radio frequency noise filtering/isolation components. Such components may also prevent the driver interface module 102 from electrically impairing or interfering with other nearby devices.

Additionally, a number of physical hazards, such as physical shock, electrical shock, explosions, vibrations, fire, and intrusion of foreign objects, may arise throughout the course of a remotely controlled device competition. Although the driver interface module 102 may not be operated directly on the competition field, it may be placed in close enough proximity to benefit from greater physical protection. To preclude system failure or other degradation, the exemplary embodiment may optimize the external housing of the driver interface module 102 to sufficiently withstand the abovementioned hazards. Further, in the exemplary embodiment, robust, reliable, and easily-replaceable connectors may be used to support repeated plugging and unplugging into/from the driver interface module 102.

Remotely Controlled Device Controller

Figure 8:
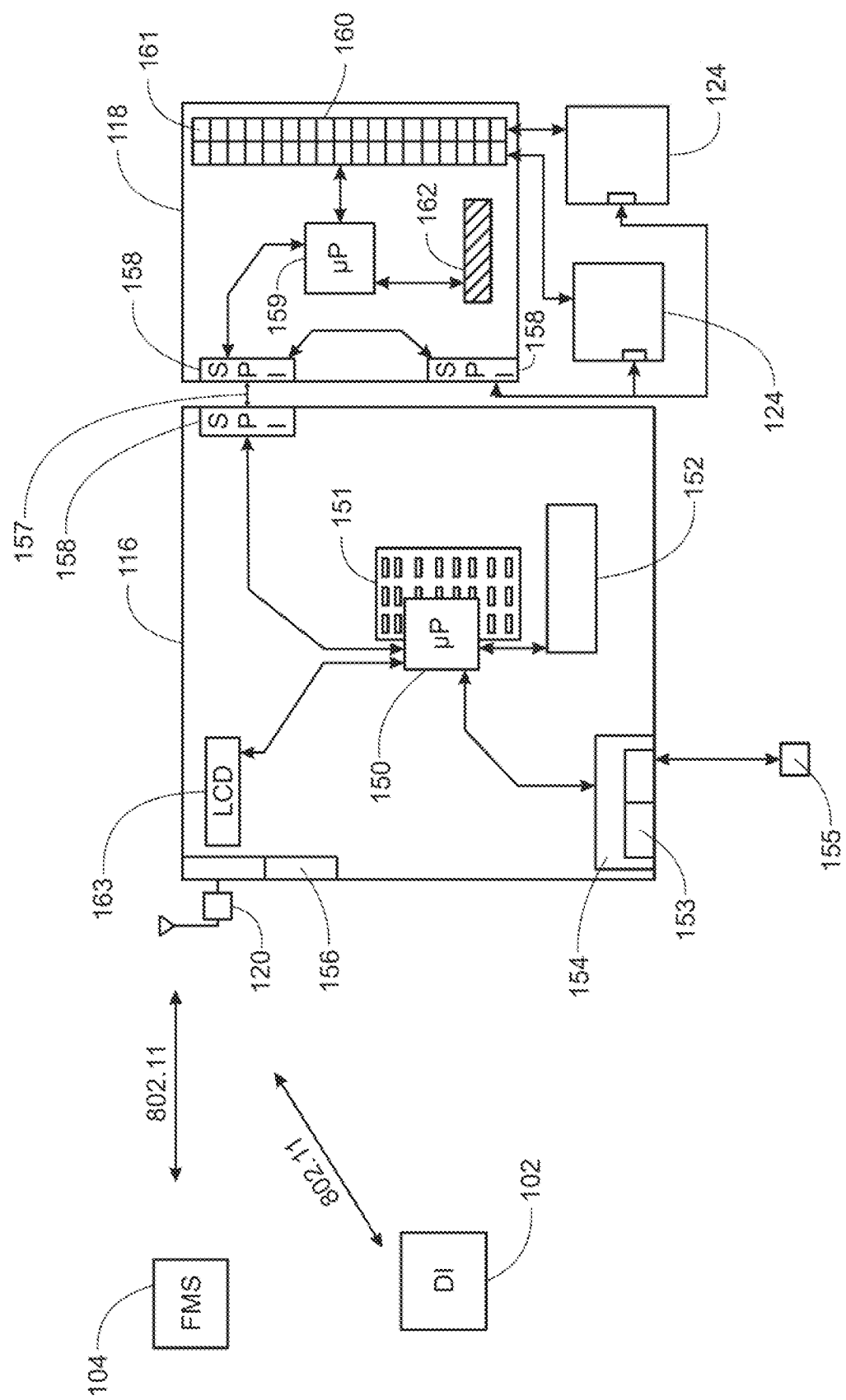
FIG. 8 is an exemplary diagram of the remotely controlled device controller and peripheral interface.

Referring to FIG. 8, in various embodiments, a remotely controlled device controller 116 is the primary processing device residing on the remotely controlled device. This controller 116, which may be powered by at least one battery, for example, in some embodiments, the controller may be powered by one of two 12V batteries located on the remotely controlled device, transceives signals from the field management system 104 and the driver interface module 102. However, in other embodiments, the controller 116 may include other types of batteries for example, but not limited to, batteries with greater or lower voltage, or more or less numbers of batteries. Received control data is processed and eventually sent to the peripheral interface 118. In the exemplary embodiment, regarding processing tasks, the remotely controlled device controller 116 may consist of a 32-bit, 400 Mhz microcontroller 119 capable of digital signal processing, a field-programmable gate array, on-board 32 Mb volatile memory 151, and a 16 Mb non-volatile memory module 152. Software control programs created by teams may be loaded into memory and executed on the processor 150 to manage signals to peripheral interface modules 124. Additionally, the remotely controlled device controller 116 may contain an LCD 163 for displaying diagnostic/status indicators.

Disable/Enable/Autonomous/Emergency-stop signals (collectively "priority signals") sent from the field management 104 system take priority over control data sent from the driver interface module 102. By way of example, if a Disable signal is received, all output sent to the peripheral interface, and corresponding peripheral interface modules 124, is locked at not-energized or neutral settings. If Enable is received, all input/output becomes available to the user.

Alternatively, various embodiments of the present invention may be used in competition where various methods of control are allowed. For example, in certain embodiments, a competition may have a Driver control mode, in which the user controls the operation of the remotely controlled device, such as a robot, and an Autonomous mode, in which the user does not control the remotely controlled device. Instead, the remotely controlled device operates on instructions that have been preprogrammed in remotely controlled device. In various embodiments, if an Autonomous signal is received; certain control signals originating from the driver interface module 102 may be ignored, while other controls such as disable signals and other safety signals may be allowed. In various other embodiments, a Hybrid control mode may be utilized in which certain user control is disabled, but other used control may be allowed in conjunction with partial autonomous control by the remotely controlled device. Such a Hybrid mode may be used in a variety of situations. In certain embodiments, Hybrid mode may be used a penalty mode to disable user control for some functions for some period in response to a violation of the rules.

In various embodiments, if an Emergency-stop signal is received, all output sent to the peripheral interface 118, and corresponding peripheral interface modules 124, is locked at not-energized or neutral settings. As a redundancy measure, this signal may also direct the peripheral interface 118 to terminate all power output.

In various embodiments, input connections found on the remotely controlled device controller 116 may consist of USB, Ethernet, I2C, Serial Peripheral Interface (SPI), analog, and digital. One or more 25 pin digital and analog connectors may allow for multiple digital/analog signals to be received. One or more USB 2.0 ports 153 may be used to facilitate use of sensor input. Similar to the USB ports 153, Ethernet ports may be used to couple sensors to the remotely controlled device 155. For example, output from a vision sensor or video camera could be used as input to the Ethernet interface 154. Once inside the remotely controlled device controller 116, vision sensor data may be parsed by a previously uploaded, user-created or configured, image-recognition program and used to generate control signals to peripheral interface modules 124. At least one Ethernet port 156 may be used for the purpose of coupling a wireless transceiver/router 120 to the remotely controlled device controller 116. This port may also be used to connect the remotely controlled device controller 116 to the field management system 104 via tether.

In various embodiments, digital and analog I/O connections on the remotely controlled device controller may have one or more additional points of access. A breakout pin interface may break out 25 pin I/O connection ports into smaller arrays of pins. Smaller sets of pins may provide the same functionality as the larger 25 pin connector; however, these smaller sets may be located anywhere on the remotely controlled device that provides easy access to a module to be connected. A breakout pin interface may allow for greater flexibility in designs with minimal flying wires. A breakout pin interface may include a means of regulating the voltage on I/O lines, such as a TPS5431 step-down converter, and reverse battery protection.

In various embodiments, the remotely controlled device controller 116 communicates via signal bus cable 157 to the peripheral interface 118 for the final disbursement of control signals. The SPI 158, operating in full-duplex, is used as the main data path from the remotely controlled device controller 116 to the peripheral interface 118. Both control and priority signals may be sent via the SPI 158 to be distributed to peripheral interface modules 124. Status signals may be sent from the peripheral interface 118 to the remotely controlled device controller 116 via SPI 158 for further processing or for transmission to the user.

Regarding the external housing of the remotely controlled device controller 116, in certain specific embodiments, the remotely controlled device controller 116 may reside in its own enclosure. The remotely controlled device controller 116 may be operated in an electrically hostile environment and may benefit from physical and electrical isolated from all external components. The remotely controlled device controller 116 may incorporate radio frequency noise filtering/isolation components to minimize the effects of a hostile environment. Such components may also prevent the remotely controlled device controller 116 from electrically impairing or interfering with other nearby devices. In addition, a remotely controlled device may be subject to a number of other hazardous variables during a competition, including physical shock, vibrations, electrical shock, fire, and intrusion of foreign objects. To preclude system failure or other degradation, the exemplary embodiment may optimize the external housing of the remotely controlled device controller 116 to sufficiently withstand the abovementioned hazards.

Peripheral Interface

Referring to FIG. 8, in various embodiments, the peripheral interface 118 may be the power and signal distribution/management hub for the remotely controlled device. This component may contain a central processing unit 159, such as a microprocessor or field-programmable gate array. One function of the central processing unit 159 may be to send and receive signals over the SPI 158, while other tasks may include executing power management software or processing status signals.

In various embodiments, the peripheral interface 118, functioning as a centralized power management node, may minimize the wiring overhead on the remotely controlled device because fuses and external power distribution blocks may be reduced or eliminated. Physical connections from the peripheral interface 118 to the peripheral interface modules 124 may be made through a connector strip 160. The connector strip allows wire of varying diameter, or circuit boards, to be securely attached to ports 161 through a locking or clenching mechanism. Teams may use the connection strip ports 161 for purposes, not limited to: managed power connections for servos and logic, pulse width modulation outputs, digital/analog outputs, and/or general purpose input/outputs. Managed power connections may be used as a standardized means of connecting peripheral interface modules 124 or custom circuitry. High and low resolution pulse width modulation ports may be used to drive electric motors or servos. Ports 161 on the connector strip 160 may coincide with individual status indicator ports, which allow peripheral interface module status or other data to be transmitted to the remotely controlled device controller 116.

The peripheral interface 118 may also extend the SPI to each peripheral interface module 124. The SPI may be used to feed data onto a separate bus connecting individual peripheral interface modules 124. For example, a Controller Area Network bus may be used for data transfer between peripheral interface modules 124. In various other embodiments, other buses, such as RS485, RS232, and I2C buses may be utilized.

A communications port 162 located on the peripheral interface 118 may be used to provide configuration data of managed power connections. In various embodiments, peripheral interface modules, such as DC motor controllers (both brushless DC and brushed), solid state relays, pneumatic solenoid controllers may be utilized.

In various embodiments, the peripheral interface 118 may employ smart functionality. In certain embodiments, allowing the peripheral interface greater functionality may relieve processing strain on the remotely controlled device controller 116 and provide a more resilient system of control. By way of example, smart functions may include: current logging, current reporting, dynamic power load balancing, motor stall detection, sensor error detection and reporting, or embedded bus monitoring (such as Controller Area Network).

Regarding the external housing of the peripheral interface 118, in certain specific embodiments, the peripheral interface 118 may reside in its own enclosure. The peripheral interface 118 may be operated in an electrically hostile environment and may benefit from physical and electrical isolation from all external components. The peripheral interface 118 may incorporate radio frequency noise filtering/isolation components to minimize the effects of a hostile environment. Such components may also prevent the peripheral interface 118 from electrically impairing or interfering with other nearby devices. During a competition, a remotely controlled device may be subject to a number of other hazardous variables including physical shock, vibrations, electrical shock, fire, and intrusion of foreign objects. To preclude system failure, the exemplary embodiment may optimize the external housing of the peripheral interface 118 to sufficiently withstand the abovementioned hazards.

In various other embodiments, power distribution and management functionality may reside in a component that is separate from the peripheral interface, such as a power distribution module. A power distribution module may provide power to one or more electrical components on the remotely controlled device from one or more power sources. For example, 24V and 12V batteries may be coupled to a power distribution circuitry capable of regulating and distributing 12V, 24V (5V outputs from off the 12V battery). With two different voltage sources, high current and low current output terminals may be utilized by devices requiring different power supplies. Preferably, 20-40 A auto-resetting circuit breakers may be used to prevent circuit overload conditions between distribution circuitry and output terminals; whereas the connection between the batteries and the distribution circuitry may be protected by a 120 A non-auto-resetting. LEDs may be integrated into the circuit breaker circuitry to provide a visual indication of power distribution status.

In various embodiments, a power distribution module may be capable of responding to signals from the remotely controlled device controller or directly from a driver interface. For example, the remotely controlled device controller may send a signal to the power distribution circuitry for power shut down, preventing power from being distributed from the batteries.

Peripheral Interface Modules

In various embodiments, still referring to FIG. 8, teams may utilize the peripheral interface 118 as a standardized means of coupling control systems, motors, servos, sensors, extra processing resources, smart modules, or other subsystems (generally "peripheral interface modules" 124) to a remotely controlled device. Teams may also choose to develop custom peripheral interface modules 124 in accordance with the standard input/output and electrical characteristics of the peripheral interface 118. As previously discussed, peripheral interface modules 124 may be communicably coupled through various physical bus architectures or via wireless protocol.

In certain embodiments, teams may use a drive control module for the purpose controlling and monitoring all aspects of motor functionality. A drive control module may utilize a microcontroller and a memory module to relay status information from drive systems to the SPI 158 or other bus architecture. Additionally, a drive control module may include configurable options not limited to the following features: default drive polarity for brush motors, regulated 12V or non-regulated 24V drive voltage, dynamic braking, load control circuitry. Such configurable options may be exploited through programming, jumper switches, or standard switches. Further, a drive control module may provide onboard diagnostic capabilities with visual fault indicators and fault reporting.

In various embodiments, a drive control module may incorporate smart capabilities. Smart drive capabilities may improve performance, accuracy and distribution of processing tasks related to motor control. Additionally, smart drive capabilities may reduce team development time and stress by providing a broader range of high-level programming capabilities. By way of example, left to right side drive coordination may be incorporated into the drive control module to allow for high-level, ambiguous motor commands. For instance, (using pseudo-code for exemplary purposes) a user-created command may take the form of: "Drive straight for 20 feet. Turn left in an arc of 180 degrees with a radius of 6 feet." Commands of this nature force the smart drive control module to do the brunt of the work in determining the proper motors to engage, at the proper time and rate. A smart drive control module may also be coupled to, or programmed to communicate and receive commands from, other intelligent components or sensors located on remotely controlled device. Further, a smart drive control module may allow high-level control over all other mechanical or electromechanical components, such as actuators, robotic arms, speed controllers, forward/reverse switches.

In other various embodiments, a drive control module or smart drive control module may not exist as a peripheral interface module 124, but as an additional component residing on the remotely controlled device. A drive control module may be located anywhere in the stream of information between the remotely controlled device controller 116 and the individual component to be controlled, such as a stepper motor.

In some embodiments, teams may use a relay module to provide 0-20 Amp (medium load) switching of components such as, small motors, compressors, actuators, and lights. A relay module may consist of a microcontroller capable of controlling and monitoring functions such as input/output to the SPI 158, output polarity, load control, and output voltages. Further, a relay module may provide onboard diagnostic capabilities with visual fault indicators and fault reporting.

In some embodiments, teams may use a standard input/output (IO) module to control disbursement of signals. By way of example, the standard IO module may provide management and control of digital, analog, and pulse width modulation signals to and from components such as, switches, sensors, potentiometers, solenoids, servos, motors, or other electrical devices. To facilitate IO functionality, a standard IO module may contain sixteen or more 5V digital input ports, four or more 5V analog input ports, and eight or more 7.2V pulse width modulation output ports. Further, a standard IO module may provide onboard diagnostic capabilities with visual fault indicators and fault reporting.

In some embodiments, teams may use a sensor processing module to provide high-speed signal processing. By way of example, the sensor processing module may process received digital and analog signals such as gear tooth, yaw rate, current, thermal and optical. To facilitate processing, a sensor processing module may contain eight or more 5V digital input ports, four or more 5V analog input ports, two or more dual-quadrature ports, two or more RS-232 serial ports, and one or more Ethernet ports. Further, a sensor processor module may provide onboard diagnostic capabilities with visual fault indicators and fault reporting.

Regarding the external housing of peripheral interface modules 124, in certain specific embodiments, one or more peripheral interface modules 124 may reside in an individual enclosure. Peripheral interface modules 124 may be operated in an electrically hostile environment and may greatly benefit from physical and electrical isolated from external devices and subsystems. Radio frequency noise filtering/isolation components may be coupled to, or incorporated with, individual peripheral interface modules 124 to minimize the effects of a hostile electrical environment. Such components may also prevent the peripheral interface modules 124 from electrically impairing or interfering with other nearby devices. During a competition, a remotely controlled device may be subject to a number of other hazardous variables including physical shock, electrical shock, vibrations, explosions, fire, and intrusion of foreign objects. To preclude system failure or other degradation, the exemplary embodiment may optimize the external housing of the peripheral interface 118 to sufficiently withstand the above-mentioned hazards.

Station Control Cabinet

Figure 11:
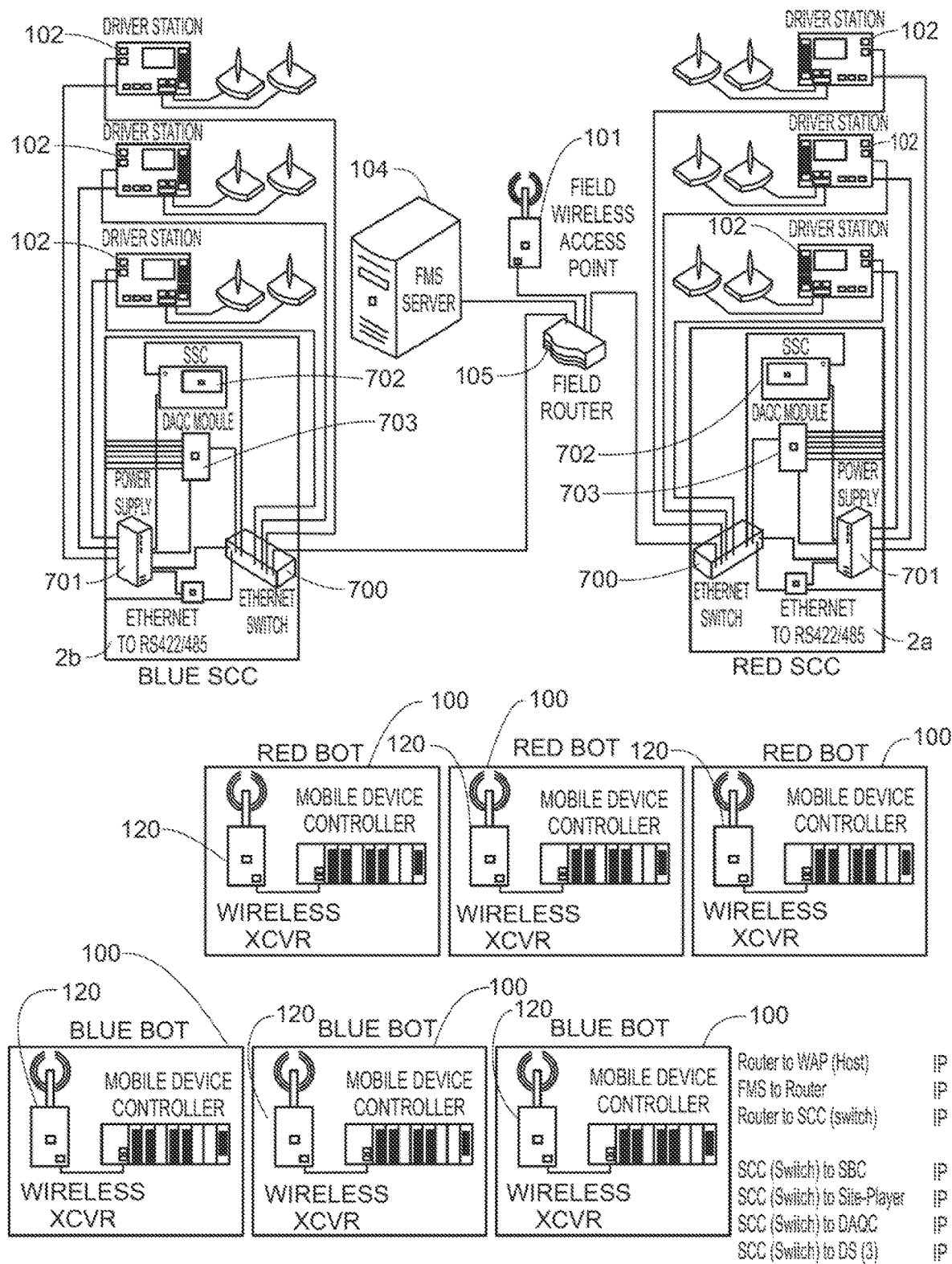
FIG. 11 is an exemplary diagram of a system for controlling remotely controlled devices with a detailed representation of station control cabinets.

Referring to FIG. 11, a station control cabinet 2*a* may be a distribution point for communications between the field management system 104 and one or more driver interface modules 102. By way of example, a red and blue team may connect one or more driver interface modules to a corresponding red/blue station control cabinet 2*a*, 2*b* for control over a remotely controlled device 100. As previously mentioned (see FIG. 6 description), a station control cabinet 2*a* may be used to facilitate reporting of team status indicators, acquire site player component data, control competition events, and debug field networking difficulties.

In various embodiments, a station control cabinet 2*a* may include multiple multiport Ethernet switches 700 rated at 1 Gbps, a processing module 702, a power supply 701 with the necessary voltage and current ratings to accommodate the components within the station control cabinet 2*a* and one or more driver interface modules 102. In the exemplary embodiment, at least three relays with contacts rated to at least 120 VAC/3 Amps may be used to control 60 Watt driver interface module 102 status indication lights. Additionally, a station control cabinet 2*a* may house a data acquisition and control module 703 from which at least six digital inputs may be used to receive wires for emergency-stop switch conditions and reporting to the field management system 104. In various embodiments, a data acquisition and control module may be an off-the-shelf Ethernet IO module, such as an Advantech 6060.

In various embodiments, a single board computer module 702 may be integrated into a station control cabinet 2*a* to perform functions such as, but not limited to, intelligent data distribution, debugging, and quality of service data logging. Where such a single board computer module 702 is utilized, the exemplary specification may include: a greater than 300 Mhz central processing unit speed, removable memory media readable by a common commercially available computer/laptop (used for loading and storing programming data onto the single board computer), at least one 10/100 Mbps Ethernet port for communication with the field network, an LCD unit of sufficient size and resolution to be legible in low light to bright light environments, a Linux operating system, a wire connection system with locking capabilities to prevent accidental disconnections, and a power connection with a built-in circuit-breaking device appropriately rated for the station control cabinet's maximum current drawing capabilities.

In various embodiments, one or more components housed in a station control cabinet may have a static IP address. Alternatively, Dynamic Host Configuration Protocol may be utilized such that components within a station control cabinet 2*a* may be configured to dynamically obtain various parameters required to operate within a wireless network.

Network Communication

In various embodiments, the process of coupling a remotely controlled device 100 and the structure of communication among components utilizing a field management system 104 may vary according to the level of security required. For instance, certain embodiments in which a minimal level of network security is required may not utilize encryption algorithms or security keys. A basic level of security may include restricting the field management system's 104 visible network address space to a fixed number of MAC addresses. Thus, a remotely controlled device 100 lacking an approved MAC address would not be able to transceive signals required for operation. Incrementally increasing network security from this basic level may include combining fixed MAC addressing with encryption algorithms, and even further requiring a SSID to gain access to the field management system network. An even higher level of security may be achieved through use of virtual local area networks in which a router may be configured to only recognize data transfer between a driver interface module 102 and remotely controlled device 100, for example.

Referring to FIG. 11, in the exemplary embodiment, a wireless access point 101 may be preconfigured as the "host" for the field it is assigned. Individual remotely controlled devices 100 may be configured as ad-hoc 'clients' to the wireless access point 101 to associate with a particular wireless network. To associate and remain communicably coupled to a local wireless network, the host may allow remotely controlled device clients to initiate handshaking routines using, for example, but not limited to, a shared Wired Equivalent Privacy (WEP) key or WPA2 and a Service Set Identifier (SSID) for each field.

An automated application may be used to communicably couple a driver interface module 102 to a local wireless network and corresponding remotely controlled device 100. On initial connection of a driver interface module 102 to a station control cabinet 2, the driver interface module 102 may report its corresponding team identification number to the field management system 104 for verification. The automated program may then proceed to associate a driver interface module 102 with a field management system IP address, the remotely controlled device controller IP address, one or more hardware endpoint Media Access Control (MAC) addresses, and a team laptop computer. In certain embodiments, the driver interface module 102 may also include application software to program the correct SSID and WEP key into the wireless access point, display history of SSID/WEP modifications and field identifier on its LCD. The wireless access point 101 located on the remotely controlled device 100 may similarly be supplied with SSID and WEP key through a direct tether connection to the driver interface module 102.

Additionally, in the exemplary embodiment, the method for IP assignment (to team components requiring IP addresses) may include the process of providing each team a block of IP addresses with each address targeted to a specific device. Referring to TABLE 1, each remotely controlled device 100 may be allotted a block of ten sequential IP addresses based on team number. The first five addresses may be assigned and reserved to standard components (such as: wireless access point 120 residing on remotely controlled device, remotely controlled device controller Ethernet ports, camera, and driver interface module 102). Teams may use the remaining five IP addresses for additional custom components that require an IP address, such as a weapons system or robotic arm assembly. This addressing scheme may preclude pre-registration of IP addresses because field network software may determine which subset of static IP addresses to send data based on team number. In various embodiments, the field management system 104 may populate IP address tables for one or more remotely controlled devices 100, before competition, through use of an Inspection Station.

Still referring to the exemplary method of assigning IP addresses, a remotely controlled device 100 or a plurality of remotely controlled devices within a competition may be assigned IP addresses from a subset of IP address space not accessible to the public. Using a private wireless network IP address range may enhance network security and enhance managerial control over a remotely controlled device 100. A private local network may be facilitated via use of a leading IP octet designated private by the Internet Assigned Numbers Authority, such as 10, 172, or 192. Thus, a remotely controlled device 100, such as a robot, and its corresponding network components, may be assigned IP addresses to a private local network as shown in TABLE 1. In the exemplary embodiment, a private IP address incorporating the team number may be constructed with the second and third octets reserved for team identification number and the fourth octet distinguishing a specific subsystem or component, such as "10.12.64.2". In other various embodiments, the arrangement of team identification number and component identifier may be ordered in a different fashion.

TABLE 1

Remotely Controlled Device IP Addressing Scheme

| Device | IP Address | | | |
|---|---|---|---|---|
| | Private Octet | Team | Number | Component ID |
| Robot Wireless Access Point | 10 | 12 | 64 | 0 |
| Mobile Device Controller 1 | 10 | 12 | 64 | 1 |
| Mobile Device Controller 2 | 10 | 12 | 64 | 2 |
| Camera | 10 | 12 | 64 | 3 |
| Driver Interface Module | 10 | 12 | 64 | 4 |
| Weapons Subsystem [User Defined] | 10 | 12 | 64 | 5 |
| Robotic Arm [User Defined] | 10 | 12 | 64 | 6 |

In various embodiments, one or more remotely controlled devices 100 coupled to a wireless network may have a static IP address. Static IP addresses may be assigned manually prior to an event utilizing a field management system 104. Alternatively, Dynamic Host Configuration Protocol, or other protocols may be utilized such that one or more remotely controlled devices 100 may be configured to dynamically obtain various parameters required for operation within a wireless network.

The field management system 104, station control cabinets 2, and the field's wireless access point 101 may be coupled to a router 105 capable of employing quality of service monitoring/reporting and security systems. Automated quality of service monitoring data may be transmitted to a webpage, text file or other medium for diagnostic reasons. Further, security tools such as bus monitoring devices or breakout boxes may also be used to monitor quality of service/security within the field network. Such security tools may perform monitoring functions by way of connecting to any device already connected to the network and including a monitoring port or output terminal.

In the exemplary embodiment, the communication protocol for the field management system 104 may be User Datagram Protocol (UDP). As a safety concern, the latency allowed per packet through any completed communication path may be held to less than 39 milliseconds. UDP may advance this concern because it does not guarantee delivery of packets and incorporates little or no error correction procedures, making it faster than Transfer Control Protocol, for example. Considering the rate at which packets are transferred, a dropped packet containing, for example, a degree of change in the X axis of a joystick, is much less critical than a delay in packets.

In other various embodiments, at the time of connection to a station control cabinet 2, a driver interface module 102 may initiate an authentication and validation routine to synchronize a driver interface module 102 with a corresponding remotely controlled device 100. To allow the field management system 104 to communicate with individual remotely controlled devices 100 and exert control over the system, any synchronization, validation, or other authentication routine may also transmit valid one-to-one mapping results, security codes, or other identifiers to the field management system 104. By way of example, this routine may automatically associate a driver interface module 102 to the Media Access Control (MAC) and IP address(es) of a remotely controlled device 100 upon connection to the network. After initial association, a basic level of security is created because wireless communication between the two entities is based on the established unique address. Encryption algorithms (such as WEP/AES/WPA/etc), may be employed to enhance secured communication between components and prevent incidental/intentional security breaches.

Alternatively, the field management system 104 may exert complete control over synchronization, validation or authentication methods. Additionally, in certain embodiments, the field management system 104 may take control over the addressing only when security breaches or synchronization conflicts occur. By way of example, in the event of such difficulty, the field management system 104 may disable the remotely controlled device 100, purge current mapping records, reassign an identifier or team code to the remotely controlled device and corresponding driver interface module 102, save the new mapping into memory, enable the remotely controlled device 100, and relinquish control to the user.

Additionally, in the exemplary embodiment, a 42 byte Header may be concatenated to status, control, and other packet types. The Header may serve purposes of routing as well as systemic verification of communications as part of the quality of service features. Headers may also vary based on usage but may generally contain the following fields: 8 Byte destination Media Access Control (MAC) address, 8 Byte source MAC address, 2 Byte Type, 1 Byte verification/Header length, 2 Byte total length, 2 Byte identification, 1 Byte flags, 1 Byte Frag Offset, 1 Byte Time to Live, 1 Byte protocol type, 2 Byte Header Checksum, 4 Byte source IP address, 4 Byte destination IP address, 2 Byte Source Port, 2 Byte Destination Port, 2 Byte length, and 2 Byte Checksum.

Packet structure for communication from the field management system 104 to the driver interface modules 102 may take the form of a Control Byte. A Control Byte may consist of single bits for exerting control over driver interface modules 102. In the exemplary embodiment, referring to TABLE 2, binary fields are reserved for the following control signals: wireless access point link status, emergency stop status, driver interface module identification request, driver interface module reset, and driver interface module mode change (Autonomous/Not Autonomous; Enabled/Not Enabled). It should be understood that the Control Byte data may be alternatively organized and may use a different number of bits to convey the information.

TABLE 2

Control Byte
(Field Management System to Driver Interface Module)

| BIT | DATA |
| --- | --- |
| 0 | NULL |
| 1 | WAP Link |
| 2 | E-Stop |
| 3 | Info Request |
| 4 | NULL |
| 5 | Reset |
| 6 | Mode |
| 7 | Mode |

Packet structure for communication from the driver interface module 102 to the field management system 104 may consist of a 5 Byte team identification number, 4 Byte remotely controlled device IP address, and a driver interface module Status Byte. In certain embodiments, an IP addressing scheme incorporating the team identification number into a remotely controlled device's IP address may allow the 5 Byte team identification number to be omitted from the packet structure discussed herein. Alternatively, the 5 Byte space may be used for other useful to be transferred from the driver interface module 102 to the field management system 104.

A Status Byte may contain single bits for reading the status of components in communication with the driver interface module, or the driver interface module 102 itself. In the exemplary embodiment, referring to TABLE 3, binary fields are reserved for the following signals: status of the data flow with the remotely controlled device, status of the emergency-stop at the driver interface module, and current mode (Autonomous/Not Autonomous; Enabled/Not Enabled). It should be understood that the Status Byte and Status Packet data may be alternatively organized and may use a different number of bits to convey the information.

TABLE 3

Status Byte
(Driver Interface Module to Field Management System)

| BIT | DATA |
| --- | --- |
| 0 | NULL |
| 1 | Robot Link |
| 2 | E-Stop |
| 3 | NULL |
| 4 | NULL |
| 5 | NULL |
| 6 | Mode |
| 7 | Mode |

Packet structure for communication from the driver interface module 102 to the remotely controlled device 100 may take the form of a Data Packet. By way of example, Data packets may be received by the wireless access point 120 residing on the remotely controlled device 100 and processed by the remotely controlled device controller or other processing unit located therein. In the exemplary embodiment, referring to TABLE 4, the Data Packet may contain a 32 bit unsigned integer for packet-count, a Control Byte, joystick data fields, a driver interface module analog data field, a driver interface module digital data field, and a reserved byte space for future implementation. Additionally, the joystick data fields may consist of 8 Bit signed integer fields for X axis, Y axis, Z axis, X axis rotation, Y axis rotation, Z axis rotation, and a 16 Bit unsigned integer field for button presses.

In the exemplary embodiment, a Control Byte located within the Data packet may consist of single bits for exerting control over the remotely controlled device 100. Referring to TABLES 4 and 5, the Control Byte may consist of individual bits for command of emergency-stop, remotely controlled device identification query, software reset, and mode (Autonomous/Not Autonomous; Enabled/Not Enabled). It should be understood that the Data Packet and Control Byte data may be alternatively organized and may use a different number of bits to convey the information.

TABLE 4

Data Packet with Control
(Driver Interface Module to Remotely Controlled Device)

| BYTE | DATA |
| --- | --- |
| 0-3 | Packet-Cnt |
| 4 | Control |
| 5-12 | Joystick-0 |
| 13-20 | Joystick-1 |
| 21-28 | Joystick-2 |

TABLE 4-continued

Data Packet with Control
(Driver Interface Module to Remotely Controlled Device)

| BYTE | DATA |
| --- | --- |
| 29-36 | Joystick-3 |
| 37-44 | Analog Data |
| 45 | Digital Data |
| 46-54 | Reserved |

TABLE 5

Control Byte
(Driver Interface Module to Remotely Controlled Device)

| BIT | DATA |
| --- | --- |
| 0 | NULL |
| 1 | NULL |
| 2 | E-Stop |
| 3 | Query |
| 4 | NULL |
| 5 | Reset |
| 6 | Mode |
| 7 | Mode |

Packet structure for communication from the remotely controlled device 100 to the driver interface module 102 may consist of a Data Packet. A Data Packet may be the primary means of relaying status and feedback data from the device to the user. In the exemplary embodiment, referring to TABLE 6, a Data Packet may contain a Status Byte, Team Identification field, Battery Voltage field, a Digital Data Byte, and User Data. In the exemplary embodiment, the Status Byte, Team Identifier, and Digital data may be maintained by the driver interface module, while the Battery Voltage, Digital Data, and user data may be made available to the secondary Ethernet port located on the driver interface module for team "dashboard" usage.

In the exemplary embodiment, referring to TABLE 6 and TABLE 7, the Status Byte contains bits for status of the data flow with the remotely controlled device, status of the emergency-stop at the driver interface module, and current mode (Autonomous/Not Autonomous, Enabled/Not Enabled). It should be understood that the Data Packet and Status Byte data may be alternatively organized and may use a different number of bits to convey the information.

TABLE 6

Data Packet with Status
(Remotely Controlled Device to Driver Interface Module)

| BYTE | DATA |
| --- | --- |
| 0 | Status |
| 1-5 | Team ID |
| 6-7 | Battery |
| 8 | Digital Data |
| 9-88 | User Data |

TABLE 7

Status Byte
(Remotely Controlled Device to Driver Interface Module)

| BIT | DATA |
| --- | --- |
| 0 | NULL |
| 1 | NULL |
| 2 | E-Stop |
| 3 | NULL |
| 4 | NULL |
| 5 | NULL |
| 6 | Mode |
| 7 | Mode |

Real-time adjustment of packet structure according to the current components coupled to the network may preclude loss of data or other disturbances associated with packet structure/routing. Accordingly, packet structure may be modified based on the actual components in the system. By way of example, in certain embodiments a station control cabinet 2 may not contain a single board computer 702 and the field management system 104 may form packet structure as necessary according to the omitted component. Additionally, the field management system 104 may contain software capable of detecting alterations in the current network component configuration.

In the exemplary embodiments, various protocols may be used for discounting old data. These protocols lower latency and thus may improve communications within the system. In some embodiments, various protocols for failure recovery may be used.

Interface to Field Management System

In various embodiments, the field management system 104 may communicate with remotely controlled device 100 via a field management system interface 128. In the exemplary alternative embodiment of FIG. 2, the field management system interface 128 is a microprocessor. The field management system interface 128 is located on peripheral interface 118 and bridges communication between field management system 104 and driver interface module 102. Field management system interface 128 controls the application of voltage to any high-power peripheral interface modules 124 and provides remote-disable of power for any peripheral interface modules 124. Field management system interface 128 must be in constant communication with field management system 104 and driver interface 102 in order to continue providing power to remotely controlled device 100. When the operator of field management system 104 decides to disable driver interface 102 control over one or more remotely controlled devices 100, the operator may send out a disabling signal from field management system 104 to the desired remotely controlled device 100. Then, the disable message is received by field management system interface 128, which disables all power switches to peripheral interface modules 124, and thereby disabling power of remotely controlled device 100 and communication and control between driver interface 102 and its remotely controlled device 100. Communication between field management system interface 128 and field management system 104 may be wireless.

Field Management System Communication

Referring again to FIG. 2, in various embodiments, field management system 104 contains an internal router that communicates with one or more remotely controlled devices 100. In certain embodiments, field management system 104 has only one transceiver that wirelessly communicates with all associated remotely controlled device 100, rather than individual transceivers associated with a respective remotely controlled device 100. Having one transceiver to communicate with all remotely controlled devices 100 allows for a more compact and flexible systems for driver interface 102 control of a remotely controlled device 100. The field management system 104 may send Ethernet packets between the remotely controlled device controller 116 and driver interface module 106, which provides driver interface 102 with the ability to control remotely controlled device 100.

Figure 3:
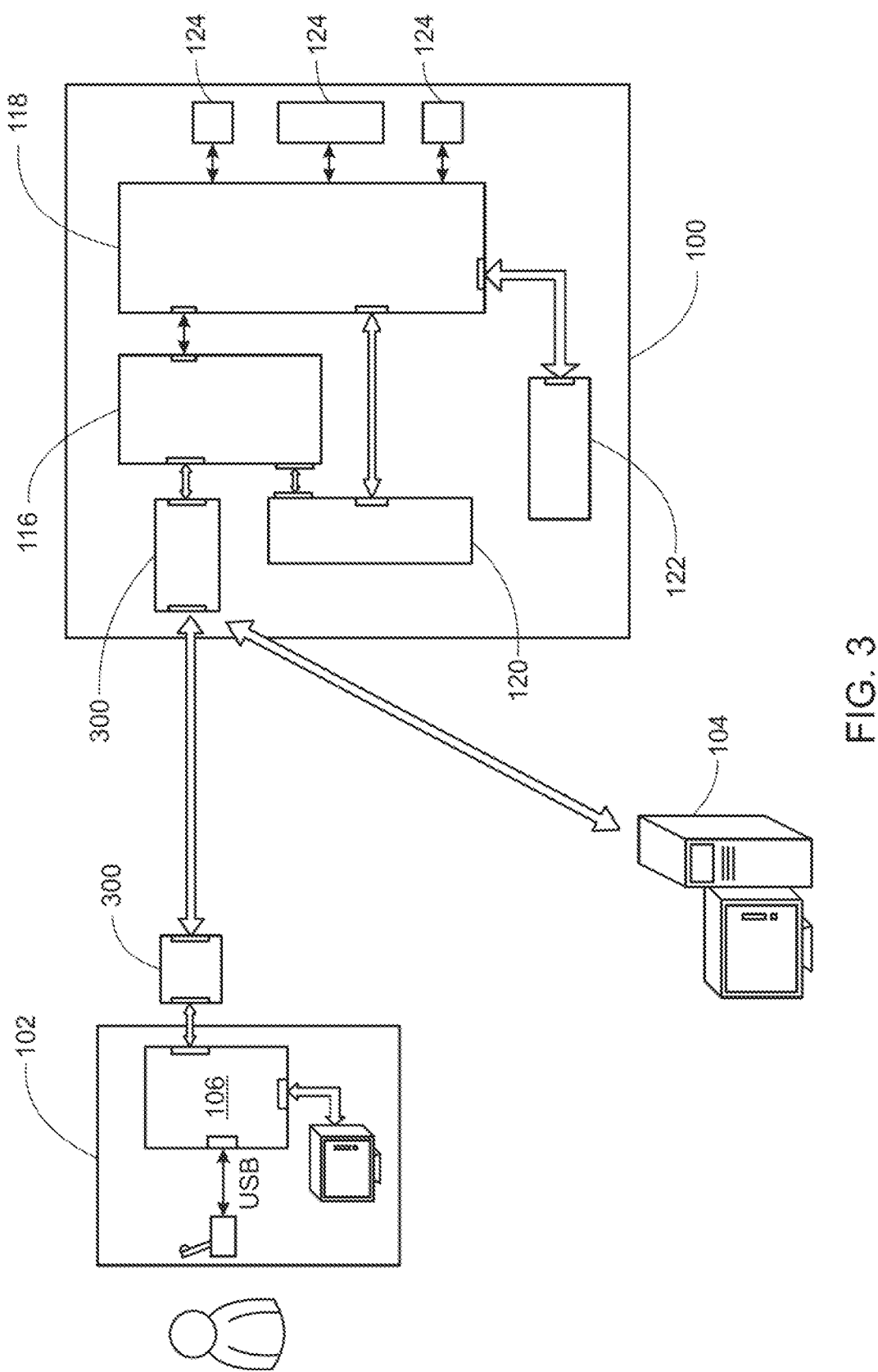
FIG. 3 is another exemplary diagram of an embodiment of the system for controlling remote control access to a remote controlled device having a gaming adapter on the remotely controlled device and a remotely controlled device router.

In an alternative embodiment, as shown in FIG. 3, the remotely controlled device 100 and driver interface module 106 may each have a wireless adapter 300 to provide wireless communication between the driver interface module 106 and the remotely controlled device controller 116.

Figure 4:
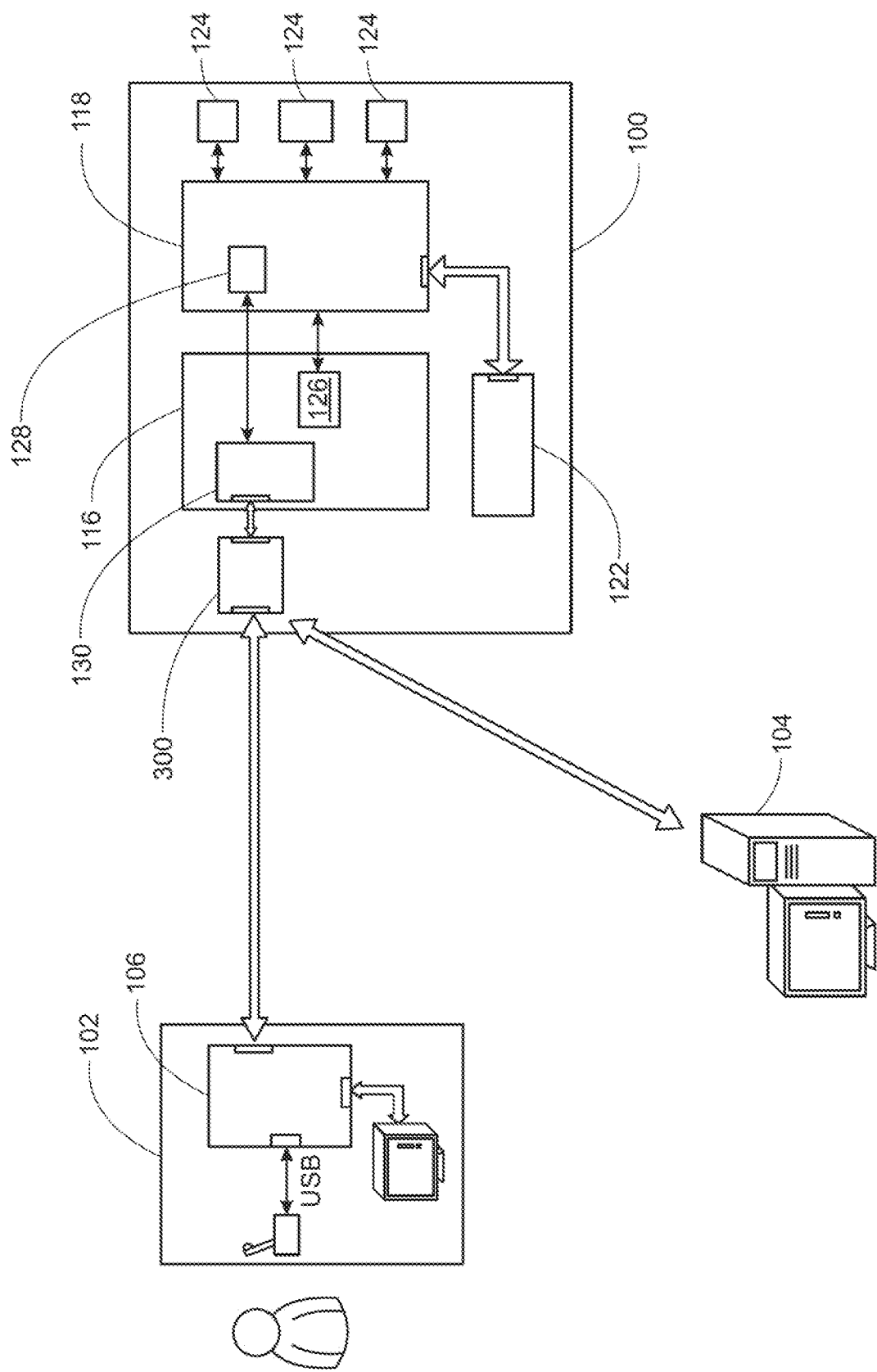
FIG. 4 is another exemplary diagram of an embodiment of the system for controlling remote control access to a remote controlled device having a gaming adapter on the remotely controlled device.

In another alternative embodiment, as shown in FIG. 4, the remotely controlled device 100 communicates with driver interface module 106 via a wireless adapter 300 that is connected to a module 130 on remotely controlled device controller 116. Wireless adapter 300 may be a wireless gaming adapter, on-board WiFi or other similar adapter. In this embodiment, a hub 126 (such as a Controller Area Network (CAN), RS323, or USB) may also be located on remotely controlled device controller 116 rather than on peripheral interface 118. The hub 126 controls the peripheral interface modules 124 powered by peripheral interface 118. Field management system interface 128, located on the peripheral interface 118, relays enable/disable messages from field management system 104 to module 130. Remotely controlled device controller 116 may also have additional interfaces and input/output ports to connect to USB devices such as thumbdrives, web cameras, to pulse width modulation generators, to I/O expanders, or to other similar interfaces.

Figure 5:
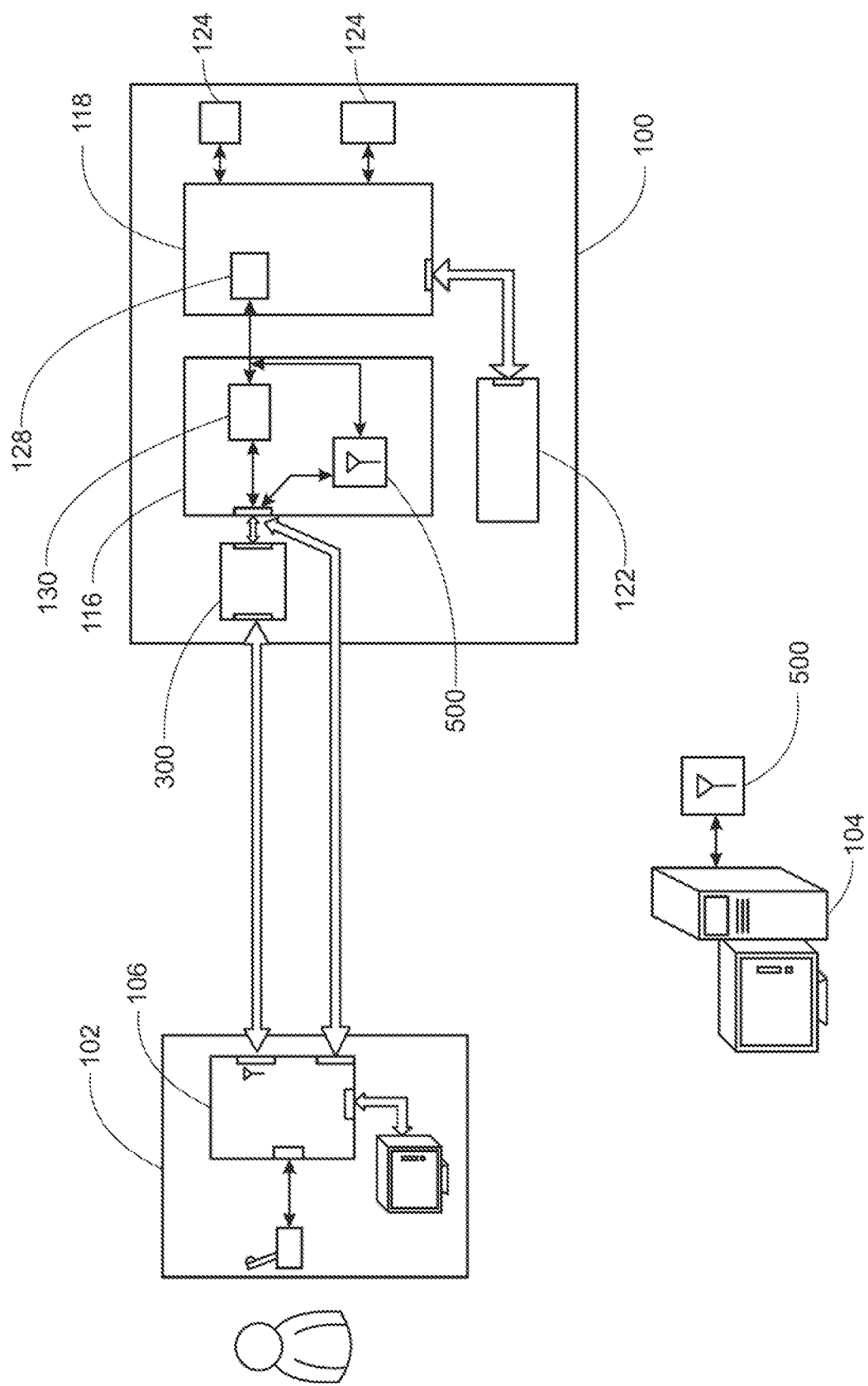
FIG. 5 is another exemplary diagram of an embodiment of the system for controlling remote control access to a remote controlled device having a key.

Referring to FIG. 5, in an alternative embodiment, the field management system interface 128 may include keys 500. The keys 500 act as a switch to enable or disable driver interface 102 communication, control, and power to remotely controlled device 100. Keys 500 may be inserted into field management system 104 to receive a message to either enable or disable driver interface 102 communication, control, or power to remotely controlled device 100. After keys 500 communicate with field management system 104, they are inserted into remotely controlled device controller 116 and communicate to remotely controlled device 100 the message placed on the keys 500 by field management system 104. That message is then communicated via a hub on module 130 to either disable or enable power on peripheral interface 118 or to interrupt Ethernet or wireless communication between driver interface 102 and remotely controlled device 100. As a result field management system 104 manages the ability of driver interface 102 to control remotely controlled device 100. In such embodiments, keys 500 are the manner in which field management system 104 sends an enable/disable signal to remotely controlled device 100. As set forth above, smart keys and other electronic means may be used in place of physical keys.

Still referring to FIG. 5, in another alternative embodiment, keys 500 may also have a manual switch for enabling or disabling communication, control, or power of remotely controlled device 100. However, when keys 500 communicate with field management system 104, communication from field management system 104 overrides the manual switch.

In various embodiments, the field management system 104 checks in with various components of the system at predetermined or variable time intervals. If any of the various components of the system that have been set as critical components do not respond to the system check, then field management system 104 may disable the remotely controlled device 100. In various other embodiments, if communication between the field management system 104 and the remotely controlled device 100 is interrupted for a preset period of time, then remotely controlled device 100 will disable itself until further commands are received.

In various embodiments, the field management system 104 may gather and transfer competition data to one or more Internet html webpages via an Extensible Markup Language (XML) data stream. Such a transfer may include periodic update of match results, schedules, ranking information, robot status indicators, streaming video feed, and other relevant competition data. Teams may use such information to, for example, implement a remote strategic planning group or allow a remote individual to keep up with live competition events. Additionally, the field management system 104 may also transfer all information and signals it generates or receives to an Internet database for statistical or debugging purposes.

In various embodiments, an XML data stream may be used to provide a virtual field management system to a remotely located field manager via an Internet connection. In such an embodiment, the remote field manager may send and receive data to, or exert control over, the actual field management system 104 through use of a graphical user interface populated with data typically available to a local field manager. In the exemplary embodiment, the remote, virtual field management system may transceive quasi-real-time data from the field management system 104 though a high-speed Internet connection.

In certain embodiments, optimized application software, executing on a remote terminal, such as a laptop with Internet access, may prove more robust and reliable than a web-based interface for remote control of the field management system 104. Such application software interface may be installed at a remote Internet terminal, provide for connection to the actual field management system 104 through various Internet protocols (such as TCP/UDP/etc.), and provide features that may not otherwise be available through a web-based interface. Streaming video feed, statistical data, and graphical situational awareness (for example using Sun SPOT three-dimensional positioning data as input to a remote function that frequently "draws" the field) are among features of a custom application interface that may be optimized for specific hardware on any given remote terminal during installation procedures.

In various embodiments, a remote interface allowing a remote field manager control over a local competition may be useful for training purposes. Given the importance of safety in a completion, those experienced in field management may wish to monitor or supersede control of field management duties where those less skilled in field management command a local field management system 104. A web-based interface, custom application or other remote implementation may incorporate specific training features such as, a training mode or learning setting that facilitates harmonious use of both local and remote field management system data.

In various embodiments, a portable embodiment of the field management system 104 may be used. For example, in some embodiments, a PDA may be used. Additionally, using the various systems, apparatus and methods discussed herein, the condition of the remotely controlled devices may be derived, for example, through light signals from the remotely controlled devices. The signals may aid in identifying and targeting any problem. Further, the field management system may provide for status information regarding both the remotely controlled devices and the drive interface modules. Thus, the condition of the apparatus of the system may be determined on both ends.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A method for controlling at least one remotely controlled device comprising:
   providing at least one remotely controlled device;
   connecting the at least one remotely controlled device directly to a field management system;
   connecting at least one driver interface directly to the field management system;
   mimicking, by the field management system, commands from the at least one driver interface, the mimicking controlling the at least one remotely controlled device;
   replaying at least one match based at least on the mimicking;
   sending a signal over a 5 GHz band from the driver interface to the field management system; and
   sending the signal over a 5 GHz band from the field management system directly to the at least one remotely controlled device, the signal controlling the at least one remotely controlled device;
   wherein all signals that control the at least one remotely controlled device are sent from the field management system to the at least one remotely controlled device over a 5 GHz band, and
   wherein the field management system disables the remotely controlled device.

2. The method of claim 1 further comprising wherein the connecting the drive interface to the field management system is over an internet connection.

3. The method of claim 1 wherein the sending a signal from the field management system directly to the at least one remotely controlled device further comprising sending the signal to a remotely controlled device controller, wherein the remotely controlled device controller is adapted to receive signals from the field management system.

4. The method of claim 1 wherein the sending a signal from the driver interface to the field management system and sending the signal from the field management system directly to the at least one remotely controlled device further comprising wherein the signal modifying power to the at least one remotely controlled device.

5. A system for controlling at least one remotely controlled device comprising:
   at least one remotely controlled device, the at least one remotely controlled device configured for autonomous operation;
   at least one field management system directly connected to the at least one remotely controlled device; and
   a driver interface directly connected to the at least one field management system, the driver interface adapted to communicate a signal to the at least one field management system, the driver interface enabling user control by a user of the at least one remotely controlled device; and
   a mode system including a hybrid mode, the hybrid mode enabling simultaneous autonomous operation and user control,
   wherein the driver interface communicates the signal over a 5 GHz band to the at least one field management system and the at least one field management system directly communicates the signal over a 5 GHz band to the at least one remotely controlled device, and
   wherein all signals that control the at least one remotely controlled device are sent from the field management system to the at least one remotely controlled device over a 5 GHz band, and
   wherein the field management system disables the remotely controlled device.

6. The system of claim 5 wherein the signal modifying control of the at least one remotely controlled device.

7. The system of claim 5 wherein the signal modifying power to the at least one remotely controlled device.

8. The system of claim 5 wherein the at least one field management system is communicatively coupled to a station control.

9. The system of claim 5 wherein the at least one field management system communicates to the at least one remotely controlled device over an internet connection.

10. The system of claim 5 wherein the drive interface comprising a toggle switch to communicate directly with the at least one remotely controlled device.

11. The system of claim 5 wherein the at least one remotely controlled device comprising a remotely controlled device controller.

12. The system of claim 11 wherein the remotely controlled device controller is adapted to receive signals from the field management system.

13. A system for controlling at least one remotely controlled device comprising:
   a driver interface module adapted to receive signals from a user;
   a remotely controlled device including
      a wireless adapter configured to provide wireless communications between the driver interface module and a remotely controlled device controller,
      a peripheral interface powering at least one peripheral through at least one peripheral interface module, the at least one peripheral interface operably coupled with the remotely controlled device,
      a transceiver/router operably coupled with the remotely controlled device controller, and
      a power source configured to provide power to the at least one peripheral interface modules;
   a driver interface module adapted to receive signals from a user; and
   a field management system directly connected to the driver interface module and the remotely controlled device, wherein the signals are sent from the driver interface module directly to the field management system, and the at least one remotely controlled device over a 5 GHz band, and
   wherein the field management system sends the signals directly to the remotely controlled device over a 5 GHz band,
   wherein all signals that control the at least one remotely controlled device are sent from the field management system to the at least one remotely controlled device over a 5 GHz band, and
   wherein the field management system disables the remotely controlled device.

14. The system of claim 13 wherein the signals modifying control of the remotely controlled device.

15. The system of claim 13 wherein the signals modifying power to the remotely controlled device.

16. The system of claim 13 wherein the field management system is communicatively coupled to a station control.

17. The system of claim 13 wherein the field management system communicates to the remotely controlled device over an internet connection.

18. The system of claim 13 wherein the drive interface comprising a toggle switch to communicate directly with the remotely controlled device.

19. The system of claim 13 wherein the remotely controlled device comprising a remotely controlled device controller.

20. The system of claim 19 wherein the remotely controlled device adapted to receive signals from the field management system.

\* \* \* \* \*